US008671903B2

(12) United States Patent
Notani

(10) Patent No.: US 8,671,903 B2
(45) Date of Patent: Mar. 18, 2014

(54) SYSTEM FOR RESTARTING INTERNAL COMBUSTION ENGINE WHEN ENGINE RESTART CONDITION IS MET

(75) Inventor: Hideya Notani, Kariya (JP)

(73) Assignee: Denso Corporation, Kariya (JP)

( * ) Notice: Subject to any disclaimer, the term of this patent is extended or adjusted under 35 U.S.C. 154(b) by 484 days.

(21) Appl. No.: 12/876,664

(22) Filed: Sep. 7, 2010

(65) Prior Publication Data

US 2011/0056450 A1 Mar. 10, 2011

(30) Foreign Application Priority Data

Sep. 4, 2009 (JP) ................................ 2009-204536
Aug. 2, 2010 (JP) ................................ 2010-173608

(51) Int. Cl.
*F02N 11/10* (2006.01)
*G06F 7/00* (2006.01)

(52) U.S. Cl.
USPC ........................................ 123/179.4; 701/113

(58) Field of Classification Search
USPC ......... 123/179.4, 179.3, 179.25, 179.28, 491; 701/113, 101, 102, 110
See application file for complete search history.

(56) References Cited

U.S. PATENT DOCUMENTS 4,418,289 A * 11/1983 Mortensen .................... 307/142
7,275,509 B2 * 10/2007 Kassner ................... 123/179.25
7,331,320 B2 * 2/2008 Asada ...................... 123/179.24
7,665,438 B2 2/2010 Hirning et al.
7,934,436 B2 * 5/2011 Laubender ...................... 74/7 R
8,036,815 B2 * 10/2011 Okumoto et al. ............. 701/110
8,069,832 B2 * 12/2011 Okumoto et al. .......... 123/179.4
8,131,452 B2 * 3/2012 Senda et al. .................. 701/110
8,171,908 B2 * 5/2012 Senda et al. ............... 123/179.4
2007/0137602 A1 6/2007 Kassner
2008/0127927 A1 * 6/2008 Hirning et al. ............ 123/179.3
2008/0162007 A1 * 7/2008 Ishii et al. ....................... 701/54

(Continued)

FOREIGN PATENT DOCUMENTS

CN 101210534 A 7/2008
CN 101287903 A 10/2008

(Continued)

OTHER PUBLICATIONS

Dec. 23, 2011 Chinese Office Action issued in Chinese Patent Application No. 201010519977.6 (with translation).

(Continued)

*Primary Examiner* — Mahmoud Gimie
*Assistant Examiner* — David Hamaoui
(74) *Attorney, Agent, or Firm* — Oliff PLC

(57) ABSTRACT

In a system, a pinion shift unit starts shift of a pinion to a ring gear for engagement therebetween during an internal combustion engine coasting in a forward direction after an automatic stop of the internal combustion engine. An engagement determining unit determines whether the pinion and the ring gear have any one of first and second positional relationships therebetween. The first positional relationship represents that the pinion is at least partly engaged with the ring gear. The second positional relationship represents that the pinion is in abutment with the ring gear. When an engine restart condition is met before it is determined that the pinion and the ring gear have any one of first and second positional relationships therebetween after the start of the shift of the pinion to the ring gear, a rotation adjusting unit adjusts a start timing of rotation of the pinion.

8 Claims, 7 Drawing Sheets

(56) References Cited

U.S. PATENT DOCUMENTS

| | | | | |
|---|---|---|---|---|
| 2009/0133532 | A1 | 5/2009 | Laubender | |
| 2010/0174473 | A1 * | 7/2010 | Pursifull et al. | 701/112 |
| 2010/0282200 | A1 * | 11/2010 | Notani et al. | 123/179.3 |
| 2010/0299053 | A1 * | 11/2010 | Okumoto et al. | 701/113 |
| 2011/0120405 | A1 * | 5/2011 | Notani | 123/179.3 |
| 2011/0137544 | A1 * | 6/2011 | Kawazu et al. | 701/113 |
| 2011/0172901 | A1 * | 7/2011 | Okumoto et al. | 701/113 |
| 2011/0178695 | A1 * | 7/2011 | Okumoto et al. | 701/103 |
| 2011/0202263 | A1 * | 8/2011 | Kawazu et al. | 701/113 |
| 2011/0203410 | A1 * | 8/2011 | Notani | 74/7 R |
| 2012/0029797 | A1 * | 2/2012 | Notani | 701/113 |

FOREIGN PATENT DOCUMENTS

| | | |
|---|---|---|
| DE | 10 2005 049 092 A1 | 4/2007 |
| JP | 2002-122059 | 4/2002 |
| JP | A-2003-214305 | 7/2003 |
| JP | A-2007-107527 | 4/2007 |
| JP | A-2008-510099 | 4/2008 |
| JP | 2008-121648 | 5/2008 |
| JP | A-2008-163818 | 7/2008 |
| JP | A-2009-168230 | 7/2009 |

OTHER PUBLICATIONS

Office Action issued in Japanese Patent Application No. 2010-173608 dated May 10, 2011 (with translation).

Sep. 29, 2012 Chinese Office Action issued in Chinese Patent Application No. 201010519977.6 (with translation).

* cited by examiner

SYSTEM FOR RESTARTING INTERNAL COMBUSTION ENGINE WHEN ENGINE RESTART CONDITION IS MET

This application is based on Japanese Patent Applications 2009-204536 and 2010-173608 filed on Sep. 4, 2009 and Aug. 2, 2010, respectively. This application claims the benefit of priority from the Japanese Patent Applications, so that the descriptions of which are all incorporated herein by reference.

FIELD OF THE INVENTION

The present invention relates to systems for restarting internal combustion engines when at least one of predetermined engine restart conditions is met.

BACKGROUND OF THE INVENTION

Engine stop-and-start systems, such as idle reduction control systems, have been recently developed. Such engine stop-and-start systems are designed to automatically stop an internal combustion engine of a vehicle in response to detecting a driver's engine stop operation, such as the operation of a brake pedal. These engine stop-and-start systems are also designed to restart the internal combustion engine in response to detecting a driver's operation to start the vehicle, such as the operation of an accelerator pedal. These engine stop-and-start systems aim at reducing fuel cost, exhaust emission, and the like.

Restarting an internal combustion engine, referred to simply as an "engine", requires initial rotation of an output shaft, such as a crankshaft, of the engine as well as normally starting the engine in response to the operation of an ignition key. These engine stop-and-start systems use a starter to provide initial rotation to the crankshaft of the engine. Specifically, in order to provide initial rotation to the crankshaft of the engine, these engine stop-and-start systems shift a pinion of the starter to a ring gear coupled to the crankshaft to thereby engage the pinion with the ring gear. Thereafter, these systems energize the starter to rotate the pinion to together with the ring gear to start cranking of the engine, thus restarting the engine.

An example of starter drive control for restarting an engine is disclosed in U.S. Pat. No. 7,275,509 corresponding to Germany Patent Application Publication No. DE 10 2005 049 092 and to Japanese Patent Application Publication No. 2007-107527. The starter drive control disclosed in these patent Publications pre-engages the pinion of the starter with the ring gear coupled to the crankshaft of the engine during the crankshaft coasting (being rotated without the aid of the engine) after automatic stop of the engine in preparation for restart of the engine. This pre-engagement of the pinion with the ring gear can restart the engine immediately in response to the driver's engine restart operation, and can reduce noise to be generated when the pinion is engaged with the ring gear.

SUMMARY OF THE INVENTION

The inventors have discovered that there is a problem in the starter drive control disclosed in these Patent Publications.

In normal starters, a pinion is located away from a ring gear coupled to a crankshaft of an engine except for the process of normal start or restart of the engine so that it takes a certain amount of time until the engagement of the pinion with the ring gear has been completed since the start of the shift of the pinion to the ring gear.

Because the starter drive control disclosed in these patent Publications is designed to pre-engage the pinion with the ring gear before the occurrence of an engine restart request, an engine restart request may occur during the interval between the start of the shift of the pinion to the ring gear and the complete of the engagement of the pinion with the ring gear.

In this case, the rotating pinion may be engaged with the ring gear just before it stops rotating, resulting in an increase in noise due to the strike and/or the friction between the pinion and the ring gear during the engagement of the pinion with the ring gear. This case also may make non-smooth the engagement of the pinion with the ring gear.

In view of the circumstances set forth above, the present invention seeks to provide systems for restarting an internal combustion engine; these systems are designed to solve such a problem set forth above.

Specifically, the present invention aims at providing systems for restarting an internal combustion engine; these systems are designed to carry out engagement of a pinion of a starter with a ring gear at a proper timing that can reduce noise due to the engagement of the pinion with the ring gear and/or make smooth the engagement of the pinion with the ring gear. This design can properly crank the internal combustion engine.

According to one aspect of the present invention, there is provided a system for causing a starter with a pinion to crank an internal combustion engine with an output shaft to which a ring gear is coupled in response to when an engine restart condition is met after an automatic stop of the internal combustion engine. The system includes a pinion shift unit configured to start shift of the pinion to the ring gear for engagement of the pinion with the ring gear during the internal combustion engine coasting in a forward direction after the automatic stop of the internal combustion engine. The system includes an engagement determining unit configured to determine whether the pinion and the ring gear have any one of first and second positional relationships therebetween. The first positional relationship represents that the pinion is at least partly engaged with the ring gear, and the second positional relationship represents that the pinion is in abutment with the ring gear. The system includes a rotation adjusting unit configured to, when the engine restart condition is met before it is determined that the pinion and the ring gear have any one of first and second positional relationships therebetween by the engagement determining unit after the start of the shift of the pinion to the ring gear, adjust a start timing of rotation of the pinion.

In normal idle reduction control, during an internal combustion engine (engine) coasting, a pinion of a starter is previously shifted to be engaged with a ring gear coupled to an output shaft of the engine before an engine restart condition is met. In the starter, the pinion is located away from the ring gear except for the process of normal start or restart of the engine so that it takes a certain amount of time until the engagement of the pinion with the ring gear has been completed since the start of the shift of the pinion to the ring gear. In addition, when an engine restart condition is met during the interval between the start of the shift of the pinion to the ring gear and the complete of the engagement of the pinion with the ring gear, the rotating pinion may be engaged with the ring gear just before it stops rotating, resulting in an increase in noise due to the strike and/or the friction between the pinion and the ring gear during the engagement of the pinion with the ring gear. This case also may make non-smooth the engagement of the pinion with the ring gear.

However, the one aspect of the present invention is configured to, when the engine restart condition is met before it is determined that the pinion and the ring gear have any one of first and second positional relationships therebetween by the engagement determining unit after the start of the shift of the pinion to the ring gear, adjust a start timing of rotation of the pinion. The first positional relationship represents that the pinion is at least partly engaged with the ring gear, and the second positional relationship represents that the pinion is in abutment with the ring gear.

Thus, the one aspect of the present invention is configured to delay the start timing of rotation of the pinion after the pinion is completely or at least partly engaged with the ring gear. This makes it possible to, even if an engine restart condition is met during a process of the engagement of the pinion with the ring gear, reliably engage the pinion with the ring gear while reducing noise due to the engagement of the pinion with the ring gear. Accordingly, this one aspect of the present invention properly engages the pinion with the ring gear, thus properly cranking the internal combustion engine.

The one aspect of the present invention is capable of delaying the start timing of rotation of the pinion after the pinion is in abutment with the ring gear. Even before the completion of engagement of the pinion with the ring gear, when the pinion is in abutment with the ring gear, the engagement of the pinion with the ring gear is carried out immediately after the abutment of the pinion with the ring gear. For this reason, the one aspect of the present invention makes it possible to reliably engage the pinion with the ring gear and reduce noise due to the engagement of the pinion with the ring gear.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
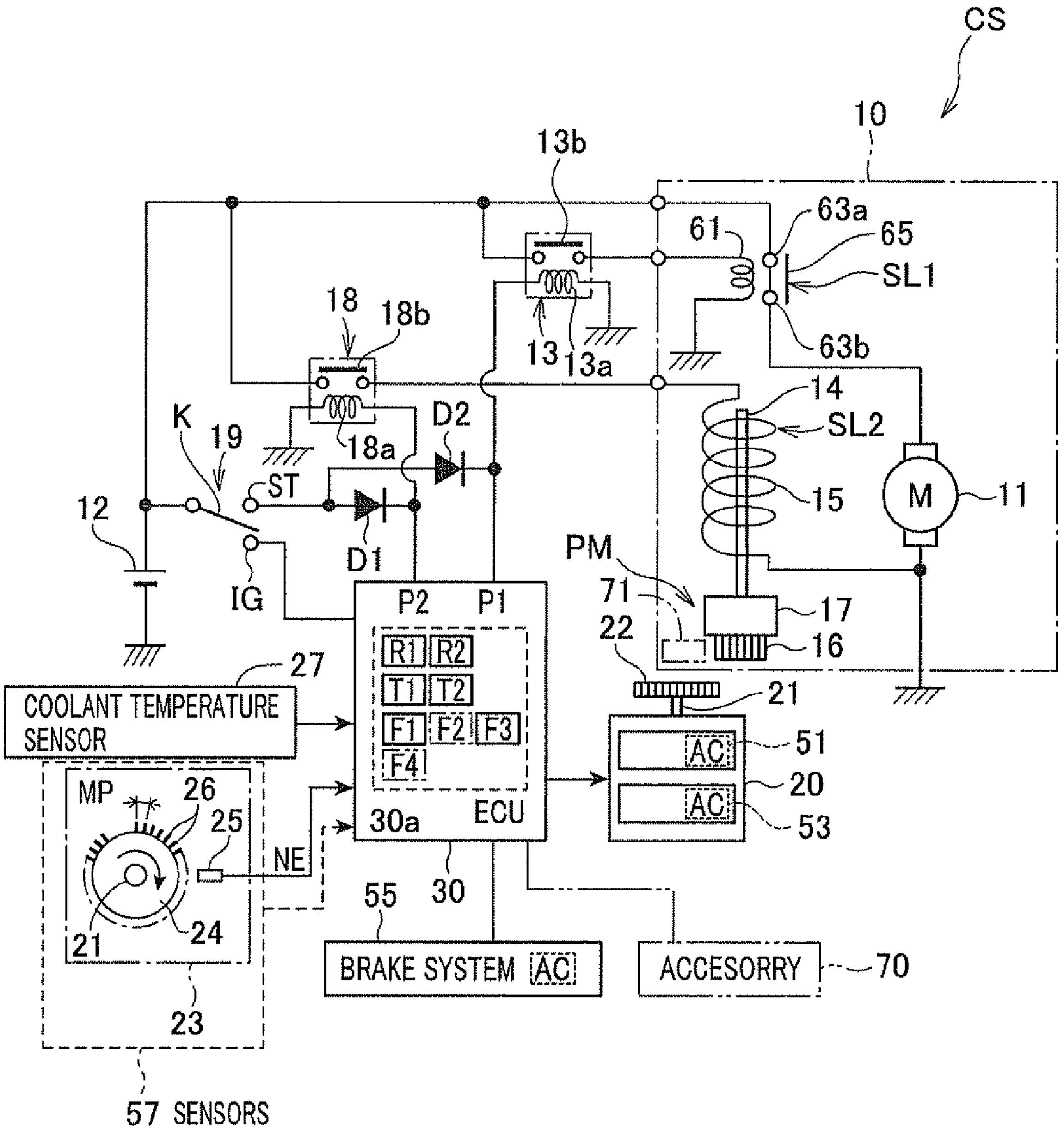
FIG. 1 is a view schematically illustrating an example of the overall hardware structure of an engine starting system according to the first embodiment of the present invention.

Embodiments of the present invention will be described hereinafter with reference to the accompanying drawings.

In the embodiments, like parts between the embodiments, to which like reference characters are assigned, are omitted or simplified in redundant description.

First Embodiment

In the first embodiment, the present invention is applied to an engine starting system designed as a part of an engine control system CS installed in a motor vehicle. The engine control system CS is comprised of an electronic control unit (ECU) 30 as a central device thereof, and is operative to control the quantity of fuel to be sprayed and the timing of ignition, and carry out a task of automatically stopping an internal combustion engine (referred to simply as engine) 20 and a task of restarting the engine 20. An example of the overall structure of the engine control system CS is illustrated in FIG. 1.

Referring to FIG. 1, the engine 20 has a crankshaft 21, as an output shaft thereof, with one end to which a ring gear 22 is directly or indirectly coupled.

The engine 20 works to compress air-fuel mixture or air by a moving piston within each cylinder, and burn the compressed air-fuel mixture or the mixture of the compressed air and fuel within each cylinder to change the fuel energy to mechanical energy, such as rotative energy, thus rotating the crankshaft 21. The rotation of the crankshaft 21 is transferred to driving wheels through a powertrain installed in the motor vehicle to thereby drive the motor vehicle. Oil (engine oil) is within each cylinder to lubricate any two parts placed in the engine 20 to be in contact with each other, such as the moving piston and each cylinder.

The engine 20 is installed with, for example, an ignition system 51 and a fuel injection system 53.

The ignition system 51 includes actuators, such as igniters, AC and causes the actuators AC to provide an electric current or spark to ignite an air-fuel mixture in each cylinder of the engine 20, thus burning the air-fuel mixture.

The fuel injection system 53 includes actuators, such as fuel injectors, AC and causes the actuators AC to spray fuel either directly into each cylinder of the engine 20 or into an intake manifold (or intake port) just ahead of each cylinder thereof to thereby burn the air-fuel mixture in each cylinder of the engine 20. When the internal combustion engine is designed as a diesel engine, the ignition system 51 can be eliminated.

In addition, in the motor vehicle, for slowing down or stopping the motor vehicle, a brake system 55 is installed.

The brake system 55 includes, for example, disc or drum brakes as actuators AC at each wheel of the motor vehicle. The brake system 55 is operative to send, to each of the brakes, a deceleration signal indicative of a braking force to be applied from each brake to a corresponding one of the wheels in response to a brake pedal of the motor vehicle being depressed by the driver. This causes each brake to slow down or stop the rotation of a corresponding one of the wheels of the vehicle based on the sent deceleration signal.

In addition, in the motor vehicle, for measuring the operating conditions of the engine 20 and the driving conditions of the motor vehicle, sensors 57 are installed in the motor vehicle.

Each of the sensors 57 is operative to measure an instant value of a corresponding one parameter associated with the operating conditions of the engine 20 and/or the motor vehicle and to output, to the ECU 30, a signal indicative of the measured value of a corresponding one parameter.

Specifically, the sensors 57 include, for example, a crank angle sensor (crankshaft sensor) 25, a coolant temperature sensor 27, an accelerator sensor (throttle position sensor), and a brake sensor; these sensors are electrically connected to the ECU 30.

The crank angle sensor 25 is operative to output, to the ECU 30, a pulse signal every time the crankshaft 21 is rotated by a preset angle of, for example, 30 degrees.

The coolant temperature sensor 27 is operative to output, to the ECU 30, a signal indicative of the temperature in an engine coolant.

The accelerator sensor is operative to:

measure an actual position or stroke of a driver-operable accelerator pedal of the motor vehicle linked to a throttle valve for controlling the amount of air entering the intake manifold; and output a signal indicative of the measured actual stroke or position of the accelerator pedal to the ECU 30.

The brake sensor is operative to measure an actual position or stroke of the brake pedal of the vehicle operable by the driver and to output a signal indicative of the measured actual stroke or position of the brake pedal.

Referring to FIG. 1, the engine control system CS includes a starter 10, a chargeable battery 12, a first drive relay 18, a second drive relay 13, a first diode D1, and a second diode D2.

The starter 10 is comprised of a starter motor (motor) 11, a pinion shaft 14, a movable pinion member PM, a motor switch SL1, and a solenoid actuator SL2.

The motor 11 is made up of an output shaft coupled to the pinion shaft 14, and an armature coupled to the output shaft and electrically connected to the motor switch SL1. The motor switch SL1 is comprised of a solenoid 61, a pair of stationary contacts 63*a* and 63*b*, and a movable contact 65. The stationary contact 63*a* is electrically connected to a positive terminal of the battery 12 whose negative terminal is grounded, and the stationary contact 63*b* is electrically connected to the armature of the motor 11.

The movable pinion member PM consists of a one-way clutch 17 and a pinion 16.

As illustrated in FIG. 1, the one-way clutch 17 is provided in helical spline engagement with an outer circumference of one end of the pinion shaft 14.

The one-way clutch 17 is comprised of a clutch outer coupled to the pinion shaft 14 and a clutch inner on which the pinion 16 is mounted; these clutch inner and clutch outer are provided in helical spline engagement with each other.

The structure of the one-way clutch 17 allows the pinion 16 to be shiftable in the axial direction of the pinion shaft 14 together with the clutch inner of the one-way clutch 17 and rotatable therewith.

The one-way clutch 17 is designed to transfer rotational motion supplied from the motor 11 to the clutch inner (pinion 16) without transferring rotational motion supplied from the clutch inner (pinion 16) to the clutch outer (motor 11).

Specifically, even if the rotational speed of the engine 20 (ring gear 22) were higher than that of the pinion 16 during the pinion 16 being meshed with the ring gear 22, the one-way clutch 17 could become disengaged so that the pinion 16 and the one-way clutch 17 could idle. This could prevent the rotation of the ring gear 22 (pinion 16) from being transferred to the starter motor 11.

The starter motor 11 is arranged to be opposite to the engine 20 such that the shift of the pinion 16 in the axial direction of the pinion shaft 14 to the engine 20 allows a tooth section of the pinion 16 to abut on a tooth section of the ring gear 22 of the engine 20 and to be meshed therewith.

The solenoid actuator SL2 is comprised of, for example, a solenoid 15 wound around the pinion shaft 14. One end of the solenoid 15 is electrically connected to the positive terminal of the battery 12 via the first drive relay 18, and the other end thereof is grounded.

The first drive relay 18 is comprised of, for example, a solenoid 18*a* and a switch 18*b*. As the first drive relay 18, a semiconductor relay can be used. One end of the solenoid 18*a* is electrically connected to an output port P2 of the ECU 30 and to an ignition switch 19 through the first diode D1, and the other end is grounded. The ignition switch 19 is provided in the motor vehicle, and is comprised of a driver operable ignition key K, an ignition-ON contact (position) 1G electrically connected to the ECU 30, and a starter-ON contact (position) ST electrically connected to the first diode D1. The ignition switch 19 is electrically connected to the positive terminal of the battery 12.

When the ignition key K is inserted by the driver in a key cylinder of the motor vehicle and operated by the driver to the ignition-ON position IG, electric power of the battery 12 is supplied to the ECU 30 so that the ECU 30 is activated.

When the ignition key K inserted in the key cylinder is turned by the driver from the ignition-ON position 1G to the starter-ON position ST, electric power of the battery 12 is supplied to the solenoid 18*a* via the first diode D1 as an engine starting signal so that the solenoid 18*a* is energized.

In addition, when an electric ON signal is supplied from the ECU 30 to the solenoid 18*a* via the output port P2, the solenoid 18*a* is energized.

The switch 18*b* is electrically connected between the positive terminal of the battery 12 and the solenoid 15, the other end of which is grounded. The switch 18*b* is turned on (closed) by magnetic force generated when the solenoid 18*a* is energized so that the solenoid 15 is energized.

When energized, the solenoid 15 shifts the pinion shaft 14 to the ring gear 22 against the force of a return spring (not shown). The shift of the pinion shaft 14 to the ring gear 22 allows the movable pinion member PM to be shifted to the ring gear 22. This allows the pinion 16 to be meshed with the ring gear 22 for cranking the engine 20.

Otherwise, when no electric ON signal is sent from the ECU 30 to the solenoid 18*a* via the output port P2, the solenoid 18*a* is deenergized so that the switch 18*b* is turned off, resulting in that the solenoid 15 is deenergized.

When deenergized, the return spring of the solenoid actuator SL2 returns the pinion shaft 14 to its original position illustrated in FIG. 1 so that the pinion 16 is out of mesh with the ring gear 22 in their initial states. While the ignition switch 19 is off or is not positioned at the starter-ON position ST, the first drive relay 18 is in off state.

Note that, in the starter 10, in order to smoothly engage the pinion 16 with the ring gear 22, a large amount of grease as lubricants is put onto slidably contact portions of some parts of the starter 10; these parts include the pinion shaft 14, the helical-spline fit portions, and so on. Similarly, in the engine 20, a large amount of grease as lubricants is put onto slidably contact portions of some parts of the engine 20; these parts include each cylinder and the piston installed therein.

The second drive relay 13 is comprised of for example, a solenoid 13*a* and a switch 13*b*. As the second drive relay 13, a semiconductor relay can be used.

One end of the solenoid 13*a* is electrically connected to an output port P1 of the ECU 30 and to the starter-ON position ST of the ignition switch 19 through the second diode D2, and the other end is grounded.

When the ignition key K inserted in the key cylinder is turned by the driver from the ignition-ON position IG to the starter-ON position ST, electric power of the battery 12 is supplied to the solenoid 13*a* via the second diode D2, resulting in that the solenoid 13*a* is energized. In addition, when an electric ON signal is supplied from the ECU 30 to the solenoid 13*a* via the output port P1, the solenoid 13*a* is energized.

The switch 13*b* is electrically connected between the positive terminal of the battery 12 and one end of the solenoid 61 whose other end is grounded. The switch 13*b* is turned on (closed) by magnetic force generated when the solenoid 13*a* is energized so that the solenoid 61 is energized.

When the solenoid 61 is energized, the movable contact 65 is abutted onto the pair of stationary contacts 63*a* and 63*b* so that the armature of the motor 11 is energized by the battery 12. This causes the motor 11 to rotate the output shaft together with the pinion shaft 14, thus rotating the pinion 16 (movable pinion member PM).

Otherwise, when no electric ON signal is sent from the ECU 30 to the solenoid 13*a* via the output port P2, the solenoid 13*a* is deenergized so that the switch 13*b* is turned off, resulting in that the solenoid 61 is deenergized. While the ignition switch 19 is off or is not positioned at the starter-ON position ST, the second drive relay 13 is in off state.

When deenergized, the movable contact 65 is separated from the pair of stationary contacts 63*a* and 63*b* so that the armature of the motor 11 is deenergized. This causes the motor 11 to stop the rotation of the output shaft and the pinion shaft 14, thus stopping the rotation of the pinion 16 (movable pinion member PM).

For example, as the crank angle sensor 23, a normal magnetic-pickup type angular sensor is used. Specifically, the crank angle sensor 23 includes a rector disk (puller) 24 coupled to the crankshaft 21 to be integrally rotated therewith. The crank angle sensor 23 also includes an electromagnetic pickup (referred to simply as "pickup") 25 arranged in proximity to the reluctor disk 24.

The reluctor disk 24 has teeth 26, spaced at preset crank-angle intervals, for example, 30° intervals (π/6 radian intervals), around the outer circumference of the disk 24. The rectangular disk 24 also has, for example, one tooth missing portion MP at which a preset number of teeth, such as two teeth, are missed. The preset crank-angle intervals define a crank-angle measurement resolution of the crank angle sensor 23. For example, when the teeth 26 are spaced at 30-degree intervals, the crank-angle measurement resolution is set to 30 degrees.

The pickup 25 is designed to pick up a change in a previously formed magnetic field according to the rotation of the teeth 26 of the reluctor disk 24 to thereby generate a pulse, which is a transition of a base signal level to a preset signal level.

Specifically, the pickup 25 is operative to output a pulse every time one tooth 26 of the rotating reluctor disk 24 passes in front of the pickup 25.

The train of pulses outputted from the pickup 25, which is referred to as an "NE signal", is sent to the ECU 30; this NE signal is used by the ECU 30 to calculate the rotational speed NE of the engine 20.

The ECU 30 is designed as, for example, a normal microcomputer circuit consisting of, for example, a CPU, a storage medium 30*a* including a ROM (Read Only Memory), such as a rewritable ROM, a RAM (Random Access Memory), and the like, an 10 (Input and output) interface, and so on.

The storage medium 30*a* stores therein beforehand various engine control programs.

The ECU 30 is operative to:

receive the signals outputted from the sensors 57; and control, based on the operating conditions of the engine 20 determined by at least some of the received signals from the sensors 57, various actuators AC installed in the engine 20 to thereby adjust various controlled variables of the engine 20.

For example, the ECU 30 is programmed to:

adjust a quantity of intake air into each cylinder;

compute a proper ignition timing for the igniter AC for each cylinder, and a proper fuel injection timing and a proper injection quantity for the fuel injector AC for each cylinder;

instruct the fuel injector AC for each cylinder to spray, at a corresponding computed proper injection timing, a corresponding computed proper quantity of fuel into each cylinder; and instruct the igniter AC for each cylinder to ignite the compressed air-fuel mixture or the mixture of the compressed air and fuel in each cylinder at a corresponding computed proper ignition timing.

In addition, the engine control programs stored in the storage medium 30*a* include an engine automatic-stop routine (program) R1. The ECU 30 repeatedly runs the engine automatic-stop routine R1 in a preset cycle during its being energized.

Specifically, in accordance with the engine automatic-stop routine R1, the ECU 30 repetitively deter nines whether at least one of predetermined engine automatic stop conditions is met based on the signals outputted from the sensors 57.

Upon determining that at least one of the predetermined engine automatic stop conditions is met, the ECU 30 carries out an engine automatic stop task T1. The engine automatic stop task T1 is, for example, to shut off the fuel injection into each cylinder of the engine 20.

The predetermined engine automatic stop conditions include, for example, the following conditions that:

the stroke of the driver's accelerator pedal is zero (the driver completely releases the accelerator pedal) so that the throttle valve is positioned in its idle speed position;

the driver depresses the brake pedal; and the engine speed is equal to or lower than a preset speed (idle-reduction execution speed).

After the automatic stop of the engine 20, in accordance with an engine restart routine R2, the ECU 30 determines whether at least one of predetermined engine restart conditions is met based on the signals outputted from the sensors 57.

When determining that at least one of the predetermined engine restart conditions is met based on the signals outputted from the sensors 57, the ECU 30 carries out an engine restart task. The engine restart task is to:

drive the starter 10 to crank the engine 20 so that the crankshaft 21 is turned at an initial speed (idle speed);

instruct the injector AC for each cylinder to restart spraying fuel into a corresponding cylinder; and instruct the igniter AC for each cylinder to restart igniting the air-fuel mixture in a corresponding cylinder.

The predetermined engine restart conditions include, for example, the following conditions that:

the accelerator pedal is depressed (the throttle valve is opened);

the stroke of the driver's brake pedal is zero (the driver completely releases the brake pedal; and the state of charge (SOC) of the battery 12, which means the available capacity in the battery 12 and is expressed as a percentage of the rated capacity, becomes equal to or less than a preset threshold percent.

In order to crank the engine 20 after the automatic stop task for the engine 20, the ECU 30 monitors, according to the NE signal outputted from the crank angle sensor 23, the rotational speed of the crankshaft 21 of the engine 20 in RPM (Revolution Per Minute), referred to simply as "engine speed".

When at least one of the engine restart conditions is met, the ECU 30 causes the starter 10 to crank the engine 20 as long as the engine speed at the timing of the at least one of the engine restart being met is equal to or less than a preset threshold. Specifically, immediately after the meeting of at least one of the engine restart conditions, the ECU 30 sends the electric ON signal to the solenoid 18*a* of the first drive relay 18 via the output port P2 to thereby start energization of the solenoid 15. The energization of the solenoid 15 shifts the pinion shaft 14 to the ring gear 22 against the force of the return spring so that the pinion 16 is meshed with the ring gear 22.

Thereafter, the ECU 30 sends the electric ON signal to the second drive relay 13 to start energization of the motor 11. This rotates the pinion 16 together with the ring gear 22, thus cranking the engine 20.

It is preferable that engine restart after automatic stop of the engine 20 is carried out as immediately as possible after at least one of the engine restart conditions is met. In contrast, if the pinion 16 were engaged with the ring gear 22 with its engine speed being high, noise due to the engagement of the pinion 16 with the ring gear 22 might increase. This increase in such noise might be irritating and unpleasant for the occupant(s). The noise due to the engagement of the pinion 16 with the ring gear 22 will be referred to as "engagement noise" hereinafter.

In order to achieve a good balance between immediate engine restart and reduction in engagement noise, the ECU 30 is operative to engage the pinion 16 with the ring gear 22 before the engine 20 is completely stopped, that is, during the crankshaft 21 coasting after the automatic stop task for the engine 20.

Specifically, the ECU 30 shuts off at least one of the fuel injection into each cylinder of the engine 20 and the ignition of the air-fuel mixture in each cylinder in response to the occurrence of an engine automatic stop request, resulting in that the engine 20 is in automatic-stopped state; this engine automatic stop request occurs when at least one of the engine automatic stop conditions is met. After the automatic stop of the engine 20, the crankshaft 21 coasts (is rotated without the aid of the engine 20). During the crankshaft 21 coasting, the ECU 30 outputs the electric ON signal to the solenoid 18*a* of the first drive relay 18 via the output port P2 to thereby start energization of the solenoid 15 when the relative speed of the pinion 16 with respect to the ring gear 22 (crankshaft 21) is within a preset low relative-speed range, such as a range from −100 RPM to +100 RPM (0±100 RPM). The energization of the solenoid 15 shifts the pinion shaft 14 to the ring gear. 22 against the force of the return spring so that the pinion 16 is engaged with the ring gear 22 in preparation for the next occurrence of at least one engine restart request.

During the pinion 16 being pre-engaged with the ring gear 22, when at least one of the engine restart conditions is met so that an engine restart request occurs, the ECU 30 sends the electric ON signal to the second drive relay 13 to start energization of the motor 11. This rotates the pinion 16 together with the ring gear 22, thus cranking the engine 20.

The pinion pre-engagement structure that pre-engages the pinion 16 with the ring gear 22 during the crankshaft 21 coasting after the automatic stop task for the engine 20 may have a possibility that an engine restart request occurs during the interval between the start of the shift of the pinion 16 to the ring gear 22 and the complete of the engagement of the pinion 16 with the ring gear 22. For example, when the pinion 16 is completely engaged with the ring gear 22, the pinion 16 and the ring gear 22 have a first positional relationship therebetween. The start of the shift of the pinion 16 to the ring gear 22 means the start of a process of engagement between the pinion 16 and the ring gear 22. That is, for engagement of the pinion 16 with the ring gear 22, it is necessary to shift the pinion 16 up to the ring gear 22. It takes a certain amount of time, such as 300 milliseconds, until the engagement of the pinion 16 with the ring gear 22 has been completed since the start of the shift of the pinion 16 to the ring gear 22. Thus, an engine restart request can occur during the shift of the pinion 16 to the ring gear 22, in other words, during the process of engagement between the pinion 16 and the ring gear 22.

If the pinion 16 were rotated in response to the occurrence of an engine restart request before the engagement of the pinion 16 with the ring gear 22 were completed, there might be a disadvantage at the engagement of the pinion 16 with the ring gear 22. Specifically, the pinion 16 rotating with a sufficiently high rotational speed might be engaged with the ring gear 22 immediately before its stop. This might result in an increase in noise due to the strike and/or the friction between the pinion 16 and the ring gear 22 during the engagement of the pinion 16 with the ring gear 22, and might make it difficult to smoothly engage the pinion 16 with the ring gear 22. These points set forth above may adversely affect on the cranking of the engine 20 by the starter 10.

Note that, when the pinion 16 is shifted to the ring gear 22, at least one gear of the pinion 16 may not be engaged with a tooth space of the ring gear 22 but be in abutment with a tooth of the ring gear 22. In this case, after the abutment of the at least one gear of the pinion 16 with the tooth of the ring gear 22, the pinion 16 is rotated by an angle corresponding to an offset between the at least one gear of the pinion 16 and a tooth space of the ring gear 22; this tooth space is the closest to the at least one tooth of the pinion 16 in the rotational direction of the pinion 16. At the completion of the rotation of the pinion 16 by the angle corresponding to the offset, the shifting force of the pinion 16 to the ring gear 22 by the solenoid 15 allows the at least one tooth of the pinion 16 to be engaged with the tooth space of the ring gear 22 so that the pinion 16 is completely engaged with the ring gear 22.

In view of the circumstances set forth above, the engine control system CS according to the first embodiment is configured to determine whether the process of engagement between the pinion 16 and the ring gear 22 is completed when at least one engine restart request occurs during the crankshaft 21 coasting after the automatic stop task for the engine 20. The engine control system CS is also configured to start rotation of the pinion 16 when it is determined that the process of engagement between the pinion 16 and the ring gear 22 is completed.

Figure 2:
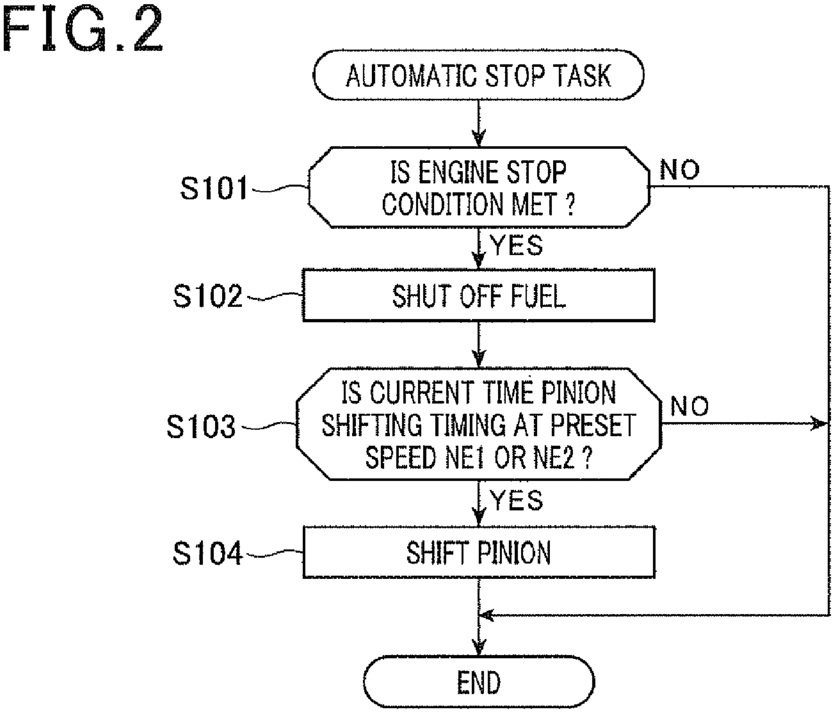
FIG. 2 is a flowchart schematically illustrating an engine automatic-stop routine to be executed by an ECU illustrated in FIG. 1 according to the first embodiment.

Next, the automatic stop task T1 to be executed by the ECU 30 in accordance with the engine automatic-stop routine R1 will be described hereinafter with reference to FIG. 2. The automatic stop task T1 includes a task for shifting the pinion 16 to the ring gear 22 after the occurrence of an engine restart request. The ECU 30 repeatedly runs the engine automatic-stop routine R1 in a preset cycle during its being energized to carry out the automatic stop task T1.

When launching the automatic-stop routine R1, the ECU 30 determines whether at least one of predetermined engine automatic stop conditions is met, in other words, an engine restart request occurs based on the signals outputted from the sensors 57 in step S101.

Upon determining that no predetermined engine automatic stop conditions are met based on the signals outputted from the sensors 57 (NO in step S101), the ECU 30 exits the automatic-stop routine R1.

Otherwise, upon determining that at least one of the engine automatic stop conditions is met (YES in step S101), the ECU 30 carries out automatic stop control of the engine 20 in step S102. Specifically, the ECU 30 controls the ignition system 51 and/or the fuel injection system 53 to stop the burning of the air-fuel mixture in each cylinder. The stop of the burning of the air-fuel mixture in each cylinder of the engine 20 means the automatic stop of the engine 20. Because of the automatic stop of the engine 20, the crankshaft 21 of the engine 20 coasts based on, for example, its inertia.

In step S103, the ECU 30 determines whether the current time corresponds to a preset pinion-shifting timing for starting the shift of the pinion 16 to the ring gear 22. As described above, in order to reduce the magnitude of the engagement noise between the pinion 16 and the ring gear 22 as much as possible, it is necessary for the ECU 30 to engage the pinion 16 with the ring gear 22 immediately before the stop of the coasting of the crankshaft 21 of the engine 20. Specifically, in order to reduce the magnitude of the engagement noise between the pinion 16 and the ring gear 22 as much as possible, it is necessary for the ECU 30 to engage the pinion 16 with the ring gear 22 when the relative speed of the pinion 16 with respect to the ring gear 22 (crankshaft 21) is within the preset low relative-speed range. This is because, the more the engine speed is reduced, the higher the effect of reduction of the magnitude of the engagement noise between the pinion 16 and the ring gear 22 is.

For example, in step S103, the ECU 30 determines whether the engine speed during the engine 20 coasting reaches a preset low rotational speed NE1, such as 100 RPM, based on the NE signal outputted from the crank angle sensor 23, and determines that the current time corresponds to the preset pinion-shifting timing for starting the shift of the pinion 16 to the ring gear 22 at the moment when determining that the engine speed reaches the preset low rotational speed NE1. Then, the ECU 30 controls the starter 10 based on the electric ON signal to thereby start shift of the pinion 16 to the ring gear 22.

Note that, as described above, the engine control system CS uses, as the crank angle sensor 23, a normal magnetic-pickup sensor. The normal magnetic-pickup sensor is designed to pick up a change in the previously formed magnetic field according to the rotation of the teeth of the reluctor disk 24 to thereby generate the NE signal. That is, during the engine 20 coasting (being automatically run down), the ECU 30 determines whether the detected engine speed reaches the preset low rotational speed NE1 in order to decide the preset pinion-shifting timing for starting the shift of the pinion 16 to the ring gear 22.

However, as described above, the engine-speed resolution of the magnetic-pickup crank angle sensor 23 is limited depending on the tooth pitches of the crank angle sensor 23. This may make it difficult for the magnetic-pickup crank angle sensor 23 to calculate, with high accuracy, the engine speed when the engine speed is within or lower than a low-speed range of, for example, 200 to 300 RPM.

In order to address such low-accuracy calculation of the engine speed, the ECU 30 can:

calculate an instantaneous engine speed based on the time taken for the crankshaft 22 to be rotated by each preset crank angle of, for example, 30 degrees;

estimate, based on the instantaneous engine speed, the following trajectory of the rotation of the crankshaft 21 during the engine 20 coasting; and determine whether the engine speed reaches the preset low rotational speed NE1 based on the estimated trajectory of the rotation of the crankshaft 21.

In order to address such low-accuracy calculation of the engine speed, the ECU 30 also can:

estimate the following trajectory of the rotation of the crankshaft 21 during the engine coasting based on at least one parameter, such as the temperature in the engine coolant or the position of the throttle valve, associated with the degree of the engine-speed drop during the engine 20 coasting; and determine whether the engine speed reaches the preset low rotational speed NE1 based on the estimated following trajectory of the rotation of the crankshaft 21.

Specifically, upon determining that the current time does not correspond to the preset pinion-shifting timing for starting the shift of the pinion 16 to the ring gear 22 (NO in step S103), the ECU 30 exits the automatic-stop routine R1.

Otherwise, upon determining that the current time corresponds to the preset pinion-shifting timing for starting the shift of the pinion 16 to the ring gear 22 (YES in step S103), the ECU 30 proceeds to step S104, and sends the electric ON signal to the solenoid 18*a* of the first drive relay 18 via the output port P2 to thereby start energization of the solenoid 15 in step S104. The energization of the solenoid 15 shifts the pinion shaft 14 to the ring gear 22 against the force of the return spring in step S104. Thereafter, the ECU 30 exits the automatic-stop routine R1.

Next, an engine restart task T2 to be executed by the ECU 30 in accordance with the engine restart routine R2 will be described hereinafter with reference to FIG. 3. The ECU 30 repeatedly runs the engine restart routine R2 at a preset cycle during its being energized to carry out the engine restart task T2.

When launching the engine restart routine R2, the ECU 30 determines whether at least one of the predetermined engine restart conditions is met based on the signals outputted from the sensors 57 in step S201.

Upon determining that no predetermined engine restart conditions are met based on the signals outputted from the sensors 57 (NO in step S201), the ECU 30 exits the engine restart routine R2.

Otherwise, upon determining that at least one of the engine restart conditions is met (YES in step S201), the ECU 30 calculates an engagement required time (ERT in FIG. 3) based on the current operating conditions of the starter 10, and determines whether the calculated engagement required time is equal to or less than a preset threshold value (TH in FIG. 3) in step S202.

The engagement required time represents a time required from the start of the shift of the pinion 16 to the ring gear 22, in other words, the output of the electric ON signal to the first drive relay 18, to the actual engagement of the pinion 16 with the ring gear 22 in which rotative power can be transferred from the pinion 16 to the ring gear 22. Thus, the engagement required time is changed depending on the current operating conditions of the starter 10.

In the first embodiment, the ECU 30 carries out, based on the temperature in the engine coolant, the calculation of the engagement required time and determination of whether the estimated engagement required time is equal to or less than the preset threshold value. The temperature in the engine coolant is a parameter associated with the temperature of the engine 20. The temperature of grease (lubricants) can be used as the parameter associated with the temperature of the engine 20.

Specifically, note that, the lower the temperature in the engine coolant (the temperature of the engine 20) is, the higher the viscosity of the grease put onto slidably contact portions of some parts of the starter 10 is. This means that, the lower the temperature in the engine coolant is, the slower the operational speed (shift speed) of the pinion 16 is. That is, the engagement required time is a function of the temperature in the engine coolant.

For example, the ECU 30 stores in the storage medium 30*a* information F3 designed as, for example, maps (data tables), programs, and/or formulas. The information F3 represents the function (relationship) between a variable of the temperature in the engine coolant and a variable of the engagement required time (see FIG. 4).

Based on the information F3, the ECU 30 determines a value of the engagement required time; this value of the engagement requited time corresponds to a current value of the temperature in the engine coolant.

Then, the ECU 30 determines whether the value of the engagement required time is equal to or less than the preset threshold value in step S202.

Upon determining that the value of the engagement required time is greater than the preset threshold value (the determination in step S202 is NO), the ECU 30 proceeds to step S203. In step S203, the ECU 30 calculates the rate ΔNE of reduction in the engine speed during the engine 20 coasting, and determines whether the rate ΔNE of reduction in the engine speed is equal to or greater than a preset threshold TH1. The rate ΔNE of reduction in the engine speed means, during the engine 20 coasting, the rate of reduction in the engine speed per unit of time, in other words, the absolute value of the inclination of the engine speed during the engine 20 coasting. The rate ΔNE of reduction in the engine speed is expressed as a positive value.

Figure 5:
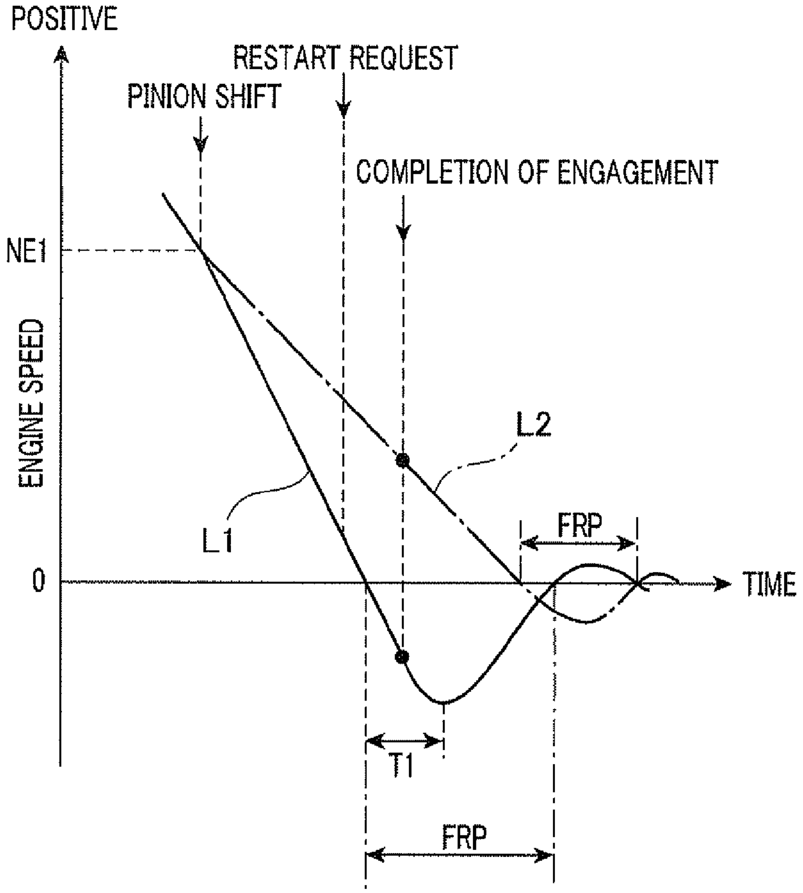
FIG. 5 is view schematically illustrating a first graph indicative of a transition example of an engine speed with an engine-speed reduction rate according to the first embodiment, and a second graph indicative of a transition example of the engine speed with the engine-speed reduction rate less than the engine-speed reduction rate of the first graph according to the first embodiment.

As illustrated in FIG. 5, when the engine speed during the engine 20 coasting after the automatic stop of the engine 20 is reduced up to zero, the engine speed is changed negatively and positively because the rotation of the crankshaft 21 oscillates in the reverse direction and the forward direction in the same manner as a pendulum, and thereafter, the engine speed converges to zero due to the friction between any two parts placed in the engine 30 to be in contact with each other, such as the moving piston and each cylinder.

Note that the rate ΔNE of reduction in the engine speed during the engine 20 coasting is changed depending on the current operating conditions of the engine 20. For example, when the temperature in the engine coolant is low, the friction of slidably contact portions of each cylinder and the piston installed therein is increased in comparison to when the temperature in the engine coolant is high, resulting in that the rate ΔNE of reduction in the engine speed during the engine 20 coasting is increased. In addition, an increase in the opening of the throttle valve increases the pulsation in the air intake in the engine 20, resulting in an increase in the compression load in each cylinder. The greater the compression load in each cylinder is, the greater the rate ΔNE of reduction in the engine speed during the engine 20 coasting is. Thus, when the opening of the throttle valve is increased, the rate ΔNE of reduction in the engine speed during the engine 20 coasting is increased.

FIG. 5 schematically illustrates a first plot indicative of the transition of the engine speed with a first value of the rate ΔNE of reduction in the engine speed during the engine 20 coasting, and a second plot of the transition of the engine speed with a second value of the rate ΔNE of reduction in the engine speed during the engine 20 coasting; this first value being greater than the second value.

FIG. 5 clearly shows that, the greater the engine-speed reduction rate ΔNE is, the greater the degree of drop in the engine speed during the time interval from the start of the process of engagement between the pinion 16 and the ring gear 22 to the completion of engagement therebetween is. That is, because the first value of the engine-speed reduction rate ΔNE (see the solid line L1) is greater than the second value of the engine-speed reduction rate ΔNE (see the dashed line L2), the degree of drop in the engine speed based on the first value of the engine-speed reduction rate ΔNE is greater than that of drop in the engine speed based on the second value of the engine-speed reduction rate ΔNE.

For this reason, when the engine-speed reduction rate ΔNE is relatively high, as illustrated in the solid line L1, the process of engagement between the pinion 16 and the ring gear 22 may be completed during the reverse rotation of the engine 20. In this case, when the motor 11 were driven to rotate the pinion 16 immediately after the completion of the process of engagement between the pinion 16 and the ring gear 22, the load on the motor 11 could be increased due to the necessity of transferring the reverse rotation of the crankshaft 21 to the forward rotation thereof. The heavy load on the motor 11 could result in a disadvantage, such as an increase in the consumed power of the motor 11.

Particularly, there is a strong need to prevent the rotation of the pinion 16 by the motor 11 within a period T1 until the engine speed has reached a negative peak since zero during the reverse rotation of the crankshaft 21. This is because great turning force is needed to return the reverse rotation of the crankshaft 21 to the forward rotation thereof.

In view of the requirements set forth above, the ECU 30 according to the first embodiment is programmed to:

wait for rotation of the pinion 16 after the completion of the engagement of the pinion 16 with the ring gear 11 when the process of engagement between the pinion 16 and the ring gear 22 is estimated to be carried out during the reverse rotation of the crankshaft 21 based on the engine-speed reduction rate ΔNE; and start to rotate the pinion 16 after a preset time has elapsed since the completion of the engagement of the pinion 16 with the ring gear 22.

Specifically, in step S203, the ECU 30 compares the engine-speed reduction rate ΔNE with the preset threshold TH1, and determine whether the engagement between the pinion 16 and the ring gear 22 will be completed during the reverse rotation of the crankshaft 21 based on a result of the comparison.

Upon determining that the engine-speed reduction rate ΔNE is less than the preset threshold TH1, that is, that the engagement between the pinion 16 and the ring gear 22 will be completed during the forward rotation of the crankshaft 21 (the determination in step S203 is NO), the ECU 30 proceeds to step S204.

In step S204, the ECU 30 determines whether the process of the engagement between the pinion 16 and the ring gear 22 is completed. In the first embodiment, the ECU 30 determines, based on the information F3, a value of the engagement required time; this value of the engagement requited time corresponds to a current value of the temperature in the engine coolant, and determines whether the determined value of the engagement required time has elapsed since the start of the shift of the pinion 16 to the ring gear 22.

Upon determining that the determined value of the engagement required time has elapsed since the start of the shift of the pinion 16 to the ring gear 22 (YES in step S204), the ECU 30 determines that the process of the engagement between the pinion 16 and the ring gear 22 is completed, proceeding to step S207.

Otherwise, upon determining that the determined value of the engagement required time has not elapsed since the start of the shift of the pinion 16 to the ring gear 22 (NO in step S204), the ECU 30 exits the engine restart routine R2. Thus, the operations in steps S201 to S204 are repeatedly carried out at the preset cycle until the determined value of the engagement required time has elapsed since the start of the shift of the pinion 16 to the ring gear 22. That is, the ECU 30 disables rotation of the pinion 16 by the motor 11 until the determined value of the engagement required time has elapsed since the start of the shift of the pinion 16 to the ring gear 22. That is, upon determining that the determined value of the engagement required time has elapsed since the start of the shift of the pinion 16 to the ring gear 22 (YES in step S204), the ECU 30 determines that the process of the engagement between the pinion 16 and the ring gear 22 is completed, proceeding to step S207.

Otherwise, upon determining that the engine-speed reduction rate ΔNE is equal to greater than the preset threshold TH1, in other words, the engagement between the pinion 16 and the ring gear 22 will be completed during the reverse rotation of the crankshaft 21 (the determination in step S203 is YES), the ECU 30 proceeds to step S205.

In step S205, the ECU 30 sets a rotation disable period defined as a period during which rotation of the pinion 16 by the motor 11 is disabled after the completion of the process of the engagement between the pinion 16 and the ring gear 22. Specifically, the rotation disable period is set as a period containing a first reverse period FRP during which the crankshaft 21 is firstly rotated in the reverse direction after the automatic stop of the engine 20 (see FIG. 5). For example, in step S205, the ECU 30 sets the rotation disable period based on the engine-speed reduction rate ΔNE such that the rotation disable period is increased with increase in the engine-speed reduction rate ΔNE.

In step S206, the ECU 30 determines whether the rotation disable period has elapsed since the lapse of the engagement required time.

Upon determining that the rotation disable period has not elapsed since the lapse of the engagement required time (the determination in step S206 is NO), the ECU 30 exits the engine restart routine R2 at the current cycle. Thus, the operations in steps S201 to S203 and S206 are repeatedly carried out at the preset cycles next to the current cycle until the rotation disable period has elapsed since the lapse of the engagement required time. Note that, in the repetitive operations, the operation in step S205 is skipped because the rotation disable period has been determined by the current cycle of the engine restart routine R2.

Upon determining that the rotation disable period has elapsed since the lapse of the engagement required time (the determination in step S206 is YES), the ECU 30 proceeds to step S207. In step S207, the ECU 30 sends the electric ON signal to the solenoid 13*a* via the output port P1 to turn on the switch 13*b*, thus energizing the solenoid 61. This energization of the solenoid 61 energizes the motor 11 to thereby start rotation of the pinion 16 in step S207.

Specifically, when the process of the engagement between the pinion 16 and the ring gear 22 is estimated to be completed during the reverse rotation of the engine 20 (crankshaft 21), the ECU 30 waits for the lapse of the rotation disable period since the completion of the process of the engagement between the pinion 16 and the ring gear 22, and thereafter, drives the motor 11 to rotate the pinion 16.

On the other hand, upon determining that the value of the engagement required time is equal to or less than the preset threshold value (the determination in step S202 is YES), the ECU 30 proceeds to step S207. In step S207, the ECU 30 sends the electric ON signal to the solenoid 13*a* via the output port P1 to turn on the switch 13*b*, thus energizing the solenoid 61. This energization of the solenoid 61 energizes the motor 11 to thereby start rotation of the pinion 16 in step S207. The rotation of the pinion 16 in step S207 rotates the ring gear 22 of the engine 20 to thereby crank the engine 20.

The reason why the ECU 30 drives the motor 11 when the value of the engagement required time is equal to or less than the preset threshold value after at least one of the engine restart conditions is met is as follows:

Specifically, as described above, the engagement required time is changed depending on the current operating conditions of the starter 10. For this reason, when the time taken from the start of the shift of the pinion 16 to the occurrence of at least one engine restart request is constant, the time taken from the occurrence of the at least one engine restart request to the completion of the process of the engagement between the pinion 16 and the ring gear 22 is reduced with reduction in the engagement required time. In addition, the shorter the time taken from the occurrence of the at least one engine restart request to the completion of the process of the engagement between the pinion 16 and the ring gear 22 is, even if the pinion 16 is rotated without waiting for the completion of the engagement between the pinion 16 and the ring gear 22, the more the effects of the rotation of the pinion 16 on the engagement between the pinion 16 and the ring gear 22 can be reduced.

In view of these circumstances set forth above, the ECU 30 according to the first embodiment is programmed to immediately drive the motor 11 to crank the engine 20 when the engagement required time is relatively low.

Figure 6A:
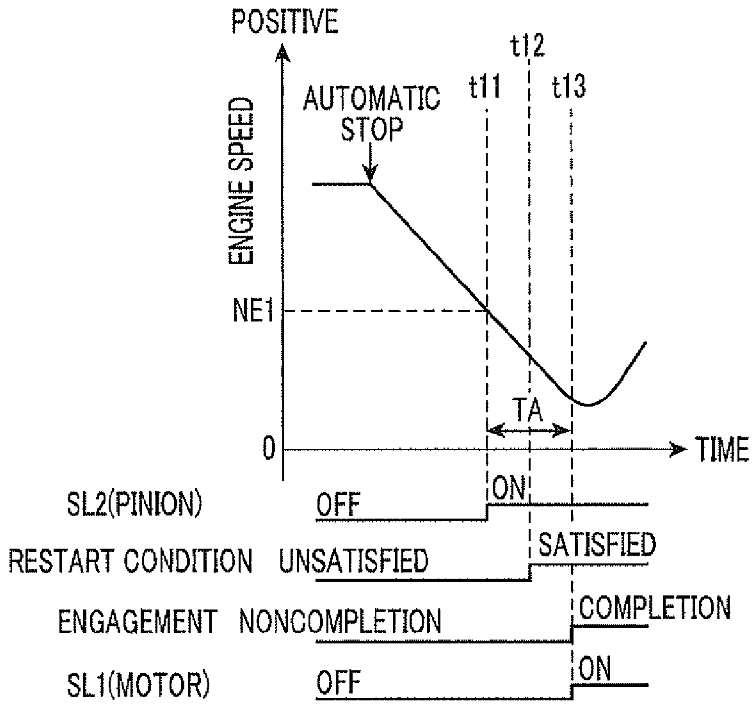
FIG. 6A is a timing chart schematically illustrating operations of the engine control system in relation to a transition of the engine speed over time when the process of an engagement between a pinion and a ring gear is completed during the forward rotation of an engine illustrated in FIG. 1 according to the first embodiment.
Figure 6B:
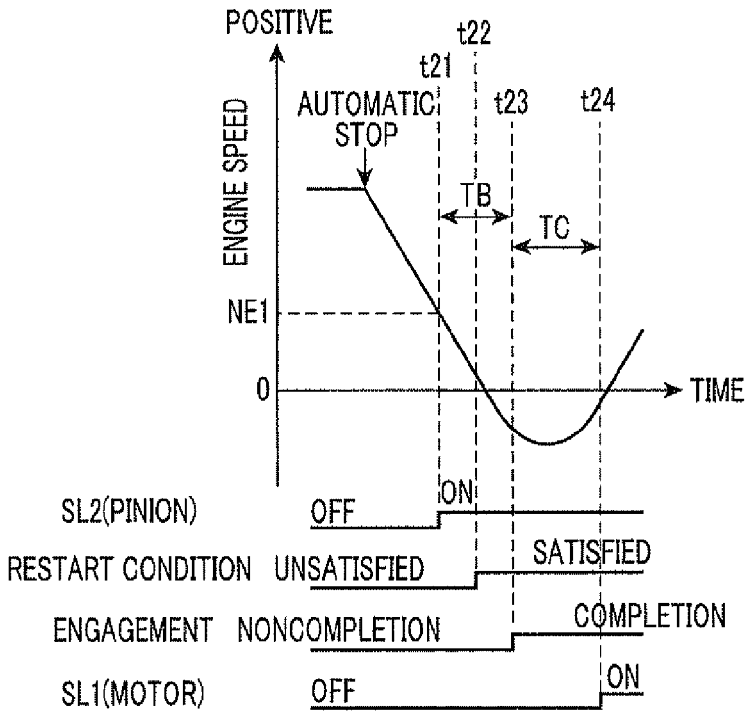
FIG. 6B is a timing chart schematically illustrating operations of the engine control system in relation to a transition of the engine speed over time when the process of the engagement between the pinion and the ring gear is completed during the reverse rotation of the engine according to the first embodiment.

The engine restart operations by the engine control system CS will be more specifically described in accordance with FIGS. 6A and 6B. FIG. 6A is a timing chart schematically illustrating operations of the engine control system CS in relation to a transition of the engine speed over time when the process of the engagement between the pinion 16 and the ring gear 22 is completed during the forward rotation of the engine 20. In contrast, FIG. 6B is a timing chart schematically illustrating operations of the engine control system CS in relation to a transition of the engine speed over time when the process of the engagement between the pinion 16 and the ring gear 22 is completed during the reverse rotation of the engine 20.

First, the engine restart operations by the engine control system CS when the process of the engagement between the pinion 16 and the ring gear 22 is completed during the forward rotation of the engine 20 will be described hereinafter.

When the engine speed becomes equal to or less than the preset low rotational speed NE1 during the engine 20 coasting after the automatic stop of the engine 20 at time t11, the electric ON signal is outputted from the ECU 30 to the first drive relay 18 illustrated in FIG. 6A so that the shift of the pinion 16 is started.

Figure 3:
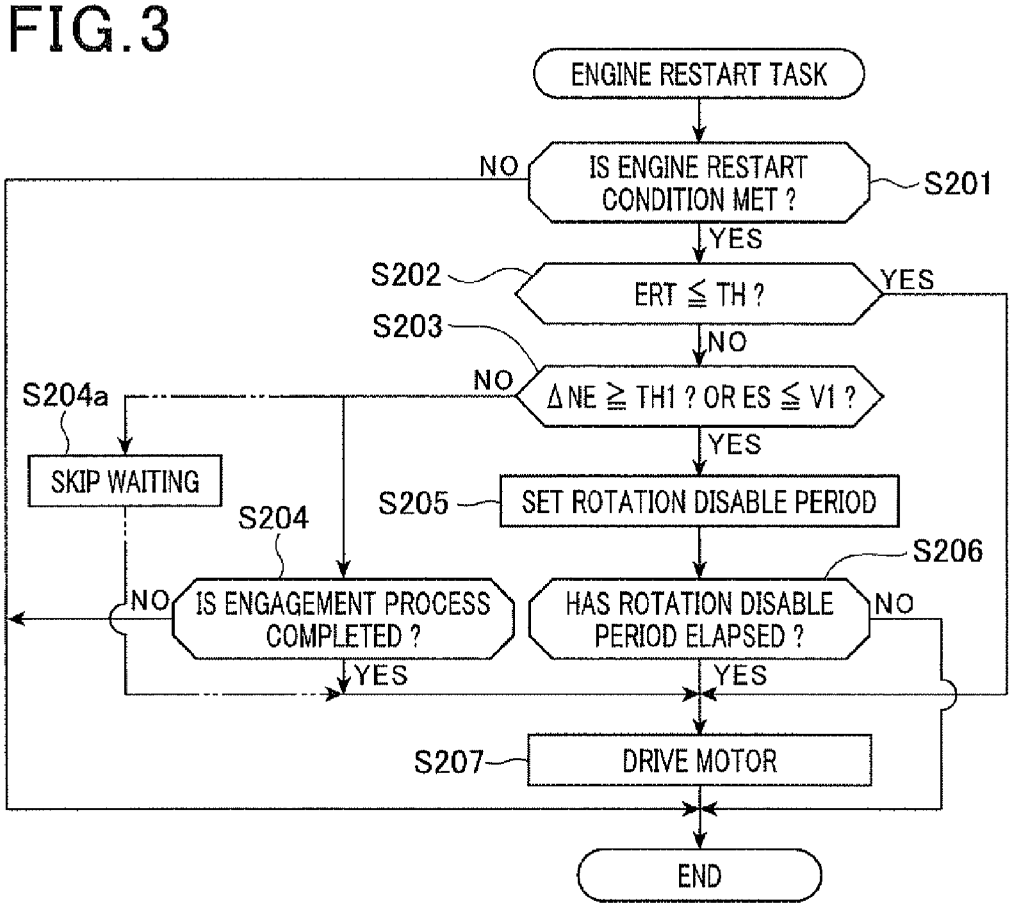
FIG. 3 is a flowchart schematically illustrating an engine restart routine to be executed by the ECU according to the first embodiment.

Thereafter, even if at least one of the engine restart conditions is met at time t12 prior to the completion of the engagement of the pinion 16 with the ring gear 22, the cranking of the engine 20 is not started at time t12 so that the motor 11 is kept inactive (see steps S201 to S204 of FIG. 3).

When the engagement required time TA has elapsed since time t11 so that it is determined that the engagement of the pinion 16 with the ring gear 22 is completed at time t13 (see YES in step S204), the electric ON signal is outputted from the ECU 30 to the second drive relay 13 at time t13 so that the motor 11 is rotated. This rotation of the motor 11 starts cranking of the engine 20.

Next, the engine restart operations by the engine control system CS when the process of the engagement between the pinion 16 and the ring gear 22 is estimated, based on the engine-speed reduction rate ONE to be completed during the reverse rotation of the engine 20 will be described hereinafter.

When the engine speed becomes equal to or less than the preset low rotational speed NE1 during the engine 20 coasting after the automatic stop of the engine 20 at time t21, the electric ON signal is outputted from the ECU 30 to the first drive relay 18 illustrated in FIG. 6B so that the shift of the pinion 16 is started.

Thereafter, even if at least one of the engine restart conditions is met at time t22, the cranking of the engine 20 is not started at time t22 so that the motor 11 is kept inactive (see steps S201 to S203 and S205 of FIG. 3).

In addition, even if the engagement required time TB has elapsed since time t21 so that it is determined that the engagement of the pinion 16 with the ring gear 22 is completed at time t23, the cranking of the engine 20 is not started at time t23 so that the motor 11 is kept inactive (see step S206).

Thereafter, when the rotation disable period TC has elapsed since time t23 (see YES in step S206), the electric ON signal is outputted from the ECU 30 to the second drive relay 13 at time t24 so that the motor 11 is rotated. This rotation of the motor 11 starts cranking of the engine 20.

Note that the timing of starting the rotation of the motor 11, in other words, the end timing of the rotation disable period TC can be determined during the reverse rotation of the engine 20 (see FIG. 6B) or during the forward rotation of the engine 20 after the reverse rotation thereof as long as the engine speed passes through its negative peak.

The engine control system CS according to the first embodiment set forth above achieves the following advantages.

First, the engine control system CS is configured to, even if at least one of the engine restart conditions is met during the process of the engagement between the pinion 16 and the ring gear 22, wait for rotation of the pinion 16 until the process of the engagement between the pinion 16 and the ring gear 22 is completed, and drive the motor 11 to rotate the pinion 16 after the completion of the engagement therebetween.

This configuration makes it possible to, even if at least one of the engine restart conditions is met during the process of the engagement between the pinion 16 and the ring gear 22, rotate the pinion 16 by the motor 11 after the engagement of the pinion 16 with the ring gear 22 is reliably completed. This configuration also makes it possible to engage the pinion 16 with the ring gear 22 with the rotational speed of the pinion 16 is less than that of the ring gear 22.

Thus, this configuration achieves an unexpected effect of reducing noise due to the engagement of the pinion 16 with the ring gear 22 while making smooth the engagement of the pinion 16 with the ring gear 22.

Second, the engine control system CS is configured to, when the process of the engagement between the pinion 16 and the ring gear 22 is estimated to be completed during the reverse rotation of the engine 20, disable rotation of the pinion 16 by the motor 11 in response to the completion of the process of the engagement between the pinion 16 and the ring gear 22. This configuration makes it possible to reduce the increase in the load on the motor 11, thus reducing increase in power consumption of the starter 10.

Third, the engine control system CS is configured to estimate whether the process of the engagement between the pinion 16 and the ring gear 22 is completed during the reverse rotation of the engine 20 based on the engine-speed reduction rate ΔNE after the automatic stop of the engine 20. This configuration makes it possible to accurately determine whether the process of the engagement between the pinion 16 and the ring gear 22 is completed during the reverse rotation of the engine 20 or during the forward rotation thereof. This accurate determination effectively prevents the pinion 16 from being rotated by the motor 11 during the rotation disable period.

Fourth, the engine control system CS is configured to, if the engagement required time is equal to or less than the preset threshold value, drive the motor 11 to rotate the pinion 16 in response to the occurrence of an engine restart request without waiting for the completion of the engagement of the pinion 16 with the ring gear 22. This is because, if the engagement required time is equal to or less than the preset threshold value, the rotation of the pinion 16 has a little influence on the engagement between the pinion 16 and the ring gear 22.

Thus, this configuration makes it possible to more immediately restart the engine 20 while accurately carrying out the engagement of the pinion 16 with the ring gear 22.

Fifth, the engine control system CS is configured to determine whether the engagement required time is equal to or less than the preset threshold value based on the temperature in the engine coolant. This configuration makes it possible to easily and accurately carry out the determination of whether to wait for the completion of the engagement of the pinion 16 with the ring gear 22.

Second Embodiment

An engine control system according to the second embodiment of the present invention will be described hereinafter with reference to FIGS. 7A to 10.

The structure and/or functions of the engine control system according to the second embodiment are different from the engine control system CS by the following points. So, the different points will be mainly described hereinafter.

The engine control system CS according to the first embodiment is designed to wait for the completion of the engagement of the pinion 16 with the ring gear 22 after the start of the shift of the pinion 16 to the ring gear 22, and thereafter drive the motor 11.

In contrast, the engine control system according to the second embodiment is configured to, after the start of the shift of the pinion 16 to the ring gear 22, drive the motor 11 at the moment when the pinion 16 is in abutment with (contact with) the ring gear 22. When the pinion 16 is in abutment with the ring gear 22, the pinion 16 and the ring gear 22 have a second positional relationship therebetween.

Next, the difference between the completion of the engagement of the pinion 16 with the ring gear 22 and the condition in which the pinion 16 is in abutment with the ring gear 22 will be fully described hereinafter with reference to FIGS. 7A to 9.

Figure 7A:
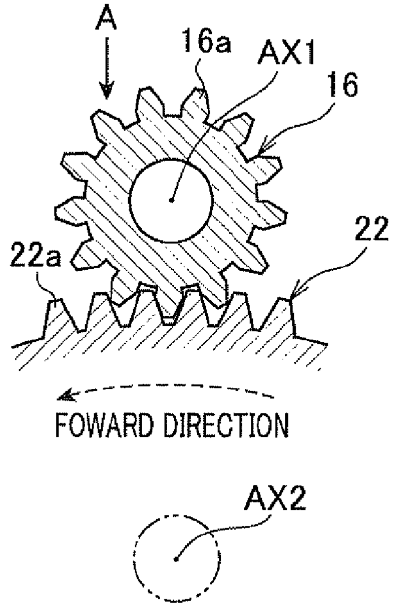
FIG. 7A is an elevational view of the pinion and part of the ring gear according to the second embodiment of the present invention.
Figure 7B:
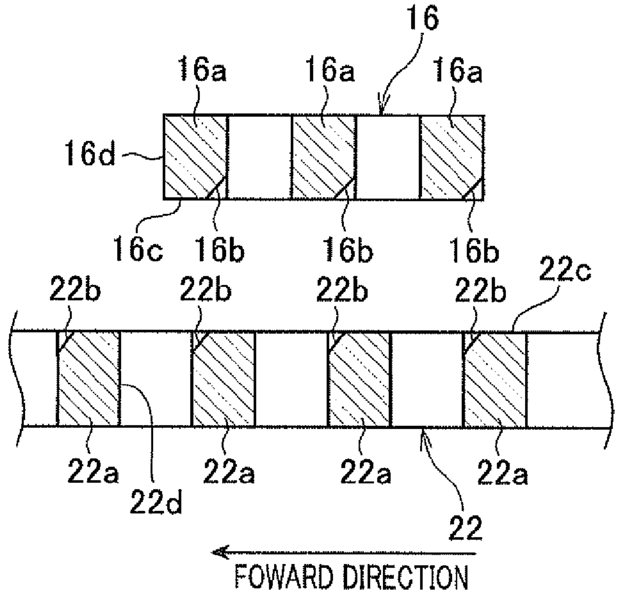
FIG. 7B is a plan view of each of the pinion and the part of the ring gear as being viewed in a direction of A illustrated in FIG. 7A.

First, the structure of the tooth section of each of the pinion 16 and the ring gear 22 will be described with reference to FIGS. 7A and 7B. FIGS. 7A and 7B illustrate the structure of the pinion 16 and that of the ring gear 22. Specifically, FIG. 7A is an elevational view of the pinion 16 and part of the ring gear 22, and FIG. 7B is a plan view of each of the pinion 16 and the part of the ring gear 22 as being viewed in a direction of A illustrated in FIG. 7A.

As illustrated in FIG. 7A, the pinion 16 and the ring gear 22 are arranged such that their rotation axes are parallel to each other. As illustrated in FIG. 1, the pinion 16 and the ring gear 22 are located away from each other in their initial states. The pinion 16 is comprised of a substantially cylindrical or ring member having a plurality of teeth 16*a* disposed, at regular pitches, on an outer circumference of the cylindrical or ring member. Similarly, the ring gear 22 is comprised of a substantially cylindrical or ring member having a plurality of teeth 22*a* disposed, at regular pitches, on an outer circumference of the cylindrical or ring member.

As described above, the starter motor 11 is arranged to be opposite to the engine 20 such that the shift of the pinion 16 in the axial direction of the pinion shaft 14 to the engine 20 allows the tooth section of the pinion 16 to abut on the tooth section of the ring gear 22 of the engine 20 and to be meshed therewith.

Each of the teeth 16*a* has a chamfered corner 16*b*, and similarly, each of the teeth 22*a* has a chamfered corner 22*b*. The chamfered corer 16*b* of one tooth 16*a* is formed by, for example, cutting away one right-angled corner of a substantially rectangular end surface 16*c* of the one tooth 16*a*; this one end surface 16*c* faces the ring gear 22. Similarly, the chamfered corer 22*b* of one tooth 22*a* is formed by, for example, cutting away one right-angled corner of a substantially rectangular end surface 22*c* of the one tooth 22*a*; this one end surface 22*c* faces the pinion 16.

The one right-angled corner of the end surface 22*c* of each tooth 22*a*, to which the chamfered corer 22*b* is formed, is a leading-edge corner thereof in the forward rotational direction of the crankshaft 21. In contrast, the one right-angled corner of the end surface 16*c* of each tooth 16*a*, to which the chamfered corer 16*b* is formed, is a trailing-edge corner thereof in the forward rotational direction of the crankshaft 21.

Figure 8:
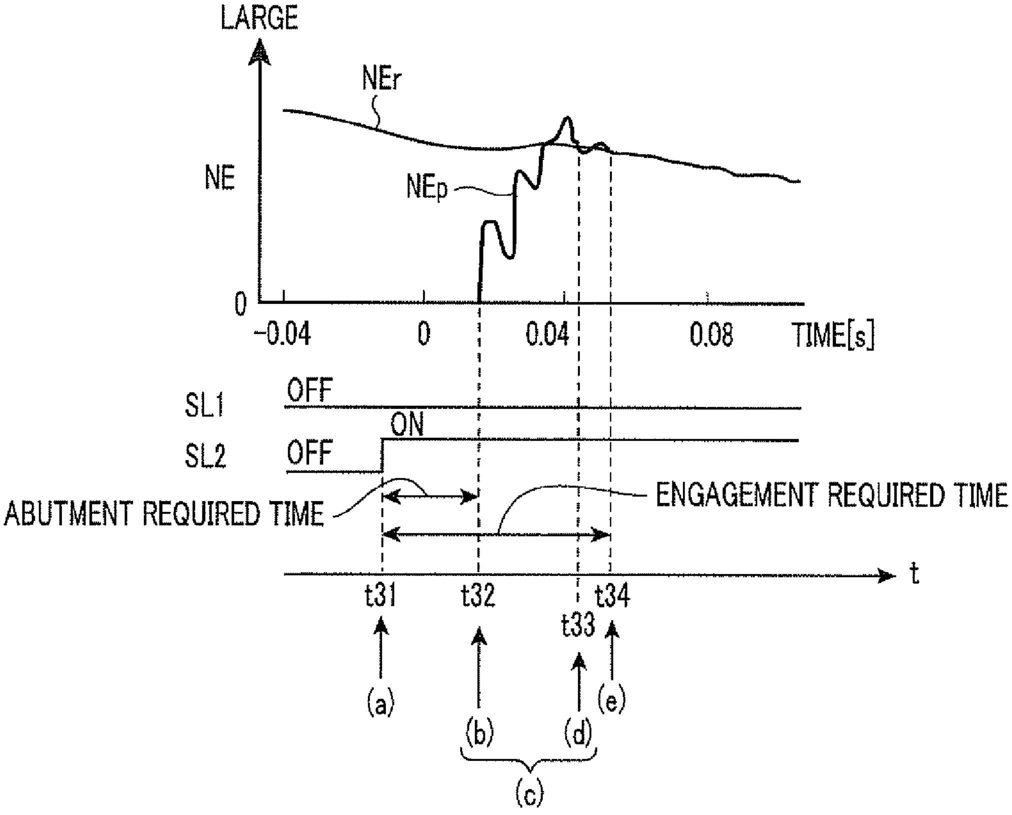
FIG. 8 is a timing chart schematically illustrating a process of an engagement between the pinion and the ring gear according to the second embodiment.
Figure 9:
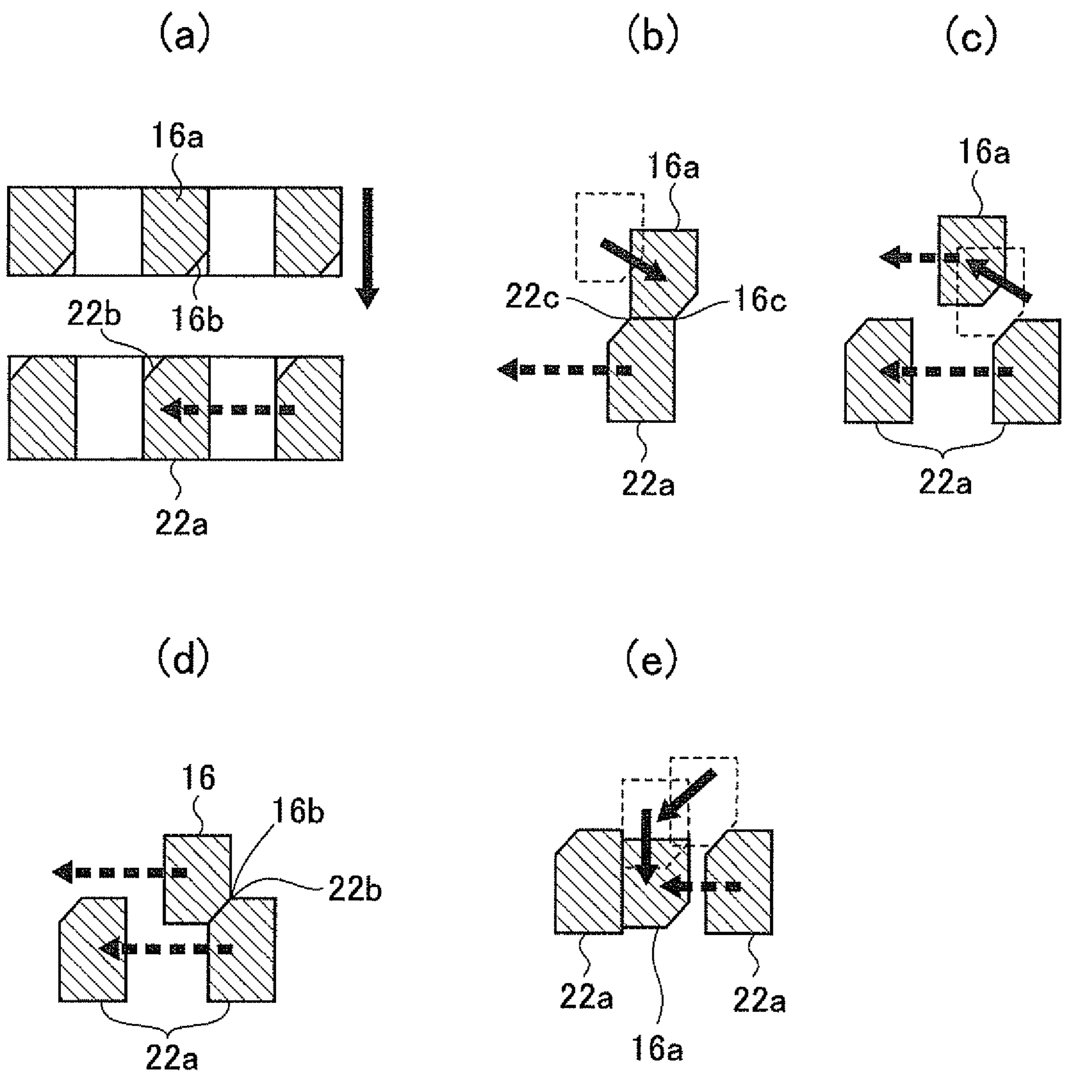
FIG. 9 is a view schematically illustrating the series of operations of the pinion and the ring gear in the process of the engagement between the pinion and the ring gear according to the second embodiment.

Next, a series of operations of the pinion 16 and the ring gear 22 in the process of the engagement between the pinion 16 and the ring gear 22 will be described hereinafter with reference to FIGS. 8 and 9. FIG. 8 is a timing chart schematically illustrating the process of the engagement between the pinion 16 and the ring gear 22, and (a) to (e) of FIG. 9 is a view schematically illustrating the series of operations of the pinion 16 and the ring gear 22 in the process of the engagement between the pinion 16 and the ring gear 22. In FIGS. 8 and 9, the process of the engagement between the pinion 16 and the ring gear 22 is for example carried out during the forward rotation of the crankshaft 21 after the automatic stop of the engine 20.

Each of (a) to (e) of FIG. 9 is a plan view of each of the pinion 16 and the part of the ring gear 22 as being viewed in the direction of A illustrated in FIG. 7A. Each of dashed arrows illustrated in FIG. 9 represents the rotational direction of the pinion 16 or the ring gear 22, and each of solid arrows illustrated in FIG. 9 represents motion of the pinion 16 except for the motion in the rotational direction thereof. (a) to (e) of FIG. 8 correspond to (a) to (e) of FIG. 9, respectively.

Prior to time t31 illustrated in FIG. 8, the first and second drive relays 18 and 13 are in off state so that the pinion 16 and the ring gear 22 are located away from each other. At that time, the ring gear 22 is rotated in the forward direction together with the rotation of the crankshaft 21 with the pinion 16 being in stopped state.

Thereafter, when the first drive relay 18 is switched from OFF to ON at time t31, the shift of the pinion 16 to the ring gear 22 is started (see (a) of FIG. 9). After the start of the shift of the pinion 16, the end surface 16*c* of one tooth 16*a* of the pinion 16 is in abutment with (in contact with) the end surface 22*c* of a corresponding tooth 22*a* of the ring gear 22 at time t32 (see (b) of FIG. 9). This state illustrated in (b) of FIG. 9 represents the contact state between the pinion 16 and the ring gear 22, and the position of the pinion 16 in the contact state represents the contact position of the pinion 16 with the ring gear 22.

The interval between time t31 and time t32 represents a time required for the pinion 16 to be shifted up to the ring gear 22 from its initial state. In other words, the interval between time t31 and time t32 represents a time required for the pinion 16 to abut on the ring gear 22 from its initial state; this time will be referred to as "abutment required time".

After time t32, because the end surfaces 16*c* of some teeth 16*a* of the pinion 16 are successively contacted with the end surfaces 22*c* of some teeth 22*a* of the ring gear 22, more specifically, the chamfered corers 16*b* of some teeth 16*a* are successively contacted with the chamfered corers 22*b* of some teeth 22*a*, the pinion 16 is gradually accelerated in its forward direction (see (c) of FIG. 9). At that time, because the rotational speed (NEp in FIG. 8) of the pinion 16 is lower than the rotational speed (NEr in FIG. 8) of the ring gear 22, the one-way clutch 17 is disengaged with the ring gear 22 so that the pinion 16 and the one-way clutch 17 idle.

The acceleration of the pinion 16 in its forward direction increases the rotational speed NEp of the pinion 16 so that the difference between the rotational speed NEp of the pinion 16 and the rotational speed NEr of the ring gear 22 is gradually reduced. Thus, the rotational speed NEp of the pinion 16 is substantially in agreement with the rotational speed NEr of the ring gear 22 at time t33 (see (d) of FIG. 9). Thereafter, because the rotational speed NEr of the ring gear 22 is reduced during the engine 20 coasting, one tooth 16*a* of the pinion 16 whose chamfered corer 16*b* is in agreement with the chamfered corer 22*b* of a corresponding one tooth 22*a* of the ring gear 22 is guided along the chamfered corer 22*b* thereof so that the one tooth 16*a* of the pinion 16 is loosely fitted in a tooth space adjacent to the one tooth 22*a* in the forward direction of the ring gear 22. This allows each tooth 16*a* of the tooth section of the pinion 16 to be loosely fitted in a corresponding one tooth space of the ring gear 22 while they are rotated, resulting in that the engagement of the pinion 16 with the ring gear 22 is completed.

The engine control system according to the second embodiment is configured to, when at least one of the engine restart conditions is met before the pinion 16 is in abutment with the ring gear 22, wait for abutment of the pinion 16 with the ring gear 22, and start rotation of the pinion 16 when the pinion 16 is in abutment with the ring gear 22. Even before the engagement of the pinion 16 with the ring gear 22, when the pinion 16 is in abutment with the ring gear 22, the engagement of the pinion 16 with the ring gear 22 is carried out immediately after the abutment of the pinion 16 with the ring gear 22. For this reason, this configuration makes it possible to reliably engage the pinion 16 with the ring gear 22 and reduce noise due to the engagement of the pinion 16 with the ring gear 22. In addition, starting rotation of the pinion 16 at the moment when the pinion 16 is in abutment with the ring gear 22 allows cranking of the engine 20 to be carried out earlier than starting rotation of the pinion 16 at the moment when engagement of the pinion 16 with the ring gear 22 is completed. This carries out restart of the engine 20 immediately in response to the occurrence of an engine restart request.

On the other hand, if the motor 11 were driven before the pinion 16 were in abutment with the ring gear 22, at the abutment of the pinion 16 with the ring gear 22, the rotational speed of the pinion 16 might be higher than that of the ring gear 22 and the relative difference therebetween might be great. In this state, if the engagement of the pinion 16 with the ring gear 22 were carried out, the leading-side surface 16*d* (see FIG. 7B) of a tooth 16*a* of the pinion 16, which serves as a power-transmission surface, might hit on the trailing-side surface 22*d* (see FIG. 7B) of a corresponding tooth 22*a* of the ring gear 22, which serves as a surface to which power is to be transmitted. This might increase noise due to the engagement of the pinion 16 with the ring gear 22 and/or might cause teeth 16*a* of the pinion 16 to wear out.

Figure 10:
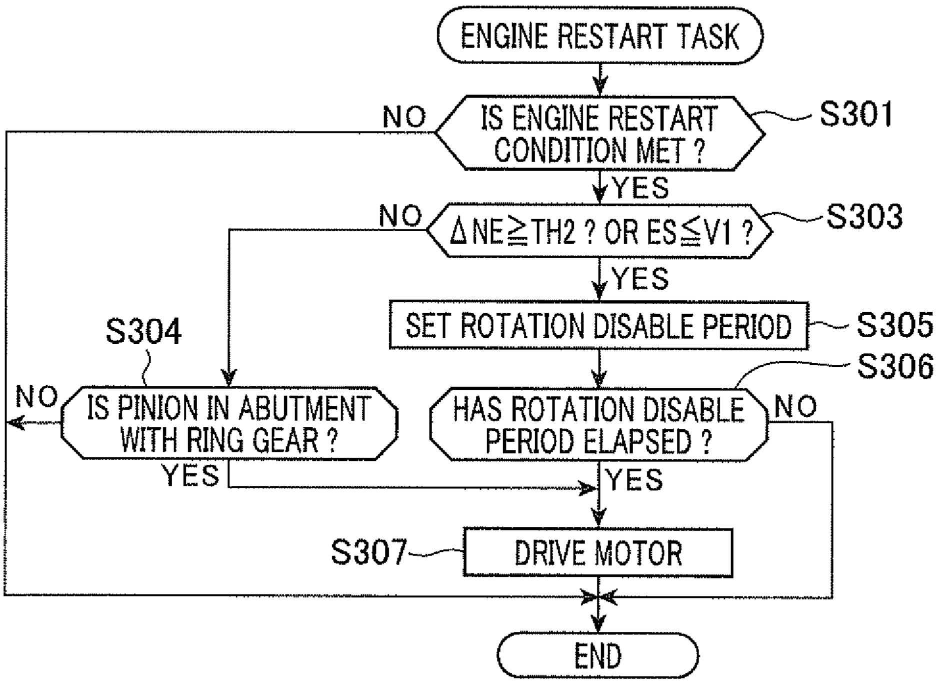
FIG. 10 is a flowchart schematically illustrating the engine restart routine to be executed by the ECU according to the second embodiment.

Next, the engine restart task T2 to be executed by the ECU 30 in accordance with the engine restart routine R2 will be described hereinafter with reference to FIG. 10. The ECU 30 repeatedly runs the engine restart routine R2 at the preset cycle during its being energized to carry out the engine restart task T2. Like steps between the engine restart routines illustrated in FIGS. 3 and 10, to which like reference characters are assigned, are omitted or simplified in description.

When launching the engine restart routine R2, the ECU 30 determines whether at least one of the predetermined engine restart conditions is met based on the signals outputted from the sensors 57 in step S301 like step S210 illustrated in FIG. 3.

Upon determining that at least one of the engine restart conditions is met (YES in step S301), the ECU 30 proceeds to step S303, and determines whether the abutment of the pinion 16 with the ring gear 22 will occur during the reverse rotation of the crankshaft 21 in step S303.

Specifically, the ECU 30 determines whether the engine-speed reduction rate ΔNE is equal to or greater than a preset threshold TH2. The threshold value TH2 can be set to be equal to the threshold TH1 or different therefrom.

Upon determining that the engine-speed reduction rate ΔNE is equal to or greater than the preset threshold TH2, that is, that the abutment of the pinion 16 with the ring gear 22 will occur during the reverse rotation of the crankshaft 21 (the determination in step S303 is YES), the ECU 30 carries out operations in steps S305 to S307 equivalent to those in steps S205 to S207 illustrated in FIG. 3.

Otherwise, upon determining that the engine-speed reduction rate ΔNE is less than the preset threshold TH2, in other words, the abutment of the pinion 16 with the ring gear 22 will occur during the forward rotation of the crankshaft 21 (the determination in step S303 is NO), the ECU 30 proceeds to step S304.

In step S304, the ECU 30 determines whether the end surface 16*c* of a tooth 16*a* of the pinion 16 is in abutment with the end surface 22*c* of a corresponding tooth 22*a* of the ring gear 22.

In the second embodiment, the ECU 30 stores in the storage medium 30*a* information F4 designed as, for example, maps (data tables), programs, and/or formulas. The information F4 represents the function (relationship) between a variable of the temperature in the engine coolant and a variable of an abutment required time.

The abutment required time represents a time required from the start of the shift of the pinion 16 to the ring gear 22, in other words, the output of the electric ON signal to the first drive relay 18, to the actual abutment of the pinion 16 with the ring gear 22.

Specifically, in step S304, the ECU 30 determines, based on the information F4, a value of the abutment required time; this value of the abutment requited time corresponds to a current value of the temperature in the engine coolant, and determines whether the determined value of the abutment required time has elapsed since the start of the shift of the pinion 16 to the ring gear 22.

Upon determining that the determined value of the abutment required time has elapsed since the start of the shift of the pinion 16 to the ring gear 22 (YES in step S304), the ECU 30 determines that the end surface 16*c* of a tooth 16*a* of the pinion 16 is in abutment with the end surface 22*c* of a corresponding tooth 22*a* of the ring gear 22, proceeding to step S307.

Otherwise, upon determining that the determined value of the abutment required time has not elapsed since the start of the shift of the pinion 16 to the ring gear 22 (NO in step S304), the ECU 30 exits the engine restart routine R2. Thus, the operations in steps S301 to S304 are repeatedly carried out at the preset cycle until the determined value of the engagement required time has elapsed since the start of the shift of the pinion 16 to the ring gear 22. That is, the ECU 30 disables rotation of the pinion 16 by the motor 11 until the determined value of the abutment required time has elapsed since the start of the shift of the pinion 16 to the ring gear 22. That is, upon determining that the determined value of the abutment required time has elapsed since the start of the shift of the pinion 16 to the ring gear 22 (YES in step S304), the ECU 30 determines that the end surface 16*c* of a tooth 16*a* of the pinion 16 is in abutment with the end surface 22*c* of a corresponding tooth 22*a* of the ring gear 22, proceeding to step S307.

In step S307, the ECU 30 sends the electric ON signal to the solenoid 13*a* via the output port P1 to turn on the switch 13*b*, thus energizing the solenoid 61. This energization of the solenoid 61 energizes the motor 11 to thereby start rotation of the pinion 16 in step S307. The rotation of the pinion 16 in step S307 rotates the ring gear 22 of the engine 20 to thereby crank the engine 20.

Note that, in step S304, the ECU 30 determines whether the end surface 16*c* of a tooth 16*a* of the pinion 16 is in abutment with the end surface 22*c* of a corresponding tooth 22*a* of the ring gear 22, but the ECU 30 can determine whether a predetermined time has elapsed since the abutment of the pinion 16 with the ring gear 22. This modification allows rotation of the pinion 16 with the teeth 16*a* being at least partially engaged with corresponding teeth 22*a*. This makes it possible to more effectively reduce noise due to the engagement of the pinion 16 with the ring gear 22.

As described above, the engine control system according to the second embodiment is configured to, when at least one of the engine restart conditions is met within the period from the start of the shift of the pinion 16 to the ring gear 22 to the abutment of the pinion 16 with the ring gear 22, wait for abutment of the pinion 16 with the ring gear 22, and start rotation of the pinion 16 when the pinion 16 is in abutment with the ring gear 22.

This configuration makes it possible to crank the engine 20 earlier than the configuration that starts rotation of the pinion 16 at the moment when engagement of the pinion 16 with the ring gear 22 is completed. This carries out restart of the engine 20 immediately in response to the occurrence of an engine restart request.

This configuration also makes it possible to more reduce the relative difference between the rotational speed of the pinion 16 and that of the ring gear 22 at the engagement of the pinion 16 with the ring gear 22 in comparison to the structure that drives the motor 22 before abutment of the pinion 16 with the ring gear 22. This prevents noise due to the engagement of the pinion 16 with the ring gear 22 from being excessively increased, and smoothly engages the pinion 16 with the ring gear 22.

The present invention is not limited to the first and second embodiments set forth above, and therefore, can be modified as follows.

The engine control system according to a first modification of each of the first and second embodiments can be configured to, when the engine-speed reduction rate ΔNE is greater than the corresponding threshold TH1 or TH2, make earlier the start of the process of the engagement between the pinion 16 and the ring gear 22. Specifically, when the process of the engagement between the pinion 16 and the ring gear 22 is estimated to be completed during the reverse rotation of the engine 20, the engine control system according to the first modification makes earlier the start of the process of the engagement between the pinion 16 and the ring gear 22 so as to complete the process before the forward rotation of the engine 20 is shifted to the reverse rotation thereof.

Specifically, the engine control system according to the first modification estimates, based on the engine-speed reduction rate ΔNE, whether the process of the engagement between the pinion 16 and the ring gear 22 will be completed during the reverse rotation of the engine 20 when the process will be started at the moment when the engine speed is equal to or less than the low rotational speed NE1 in step S103.

Then, when estimating, based on the engine-speed reduction rate ΔNE, that the process of the engagement between the pinion 16 and the ring gear 22 will be completed during the reverse rotation of the engine 20, the engine control system according to the first modification starts the shift of the pinion 16 to the ring gear 22 when the engine speed during the engine 20 coasting reaches a preset low rotational speed NE2 higher than the low rotational speed NE1 in step S103. This configuration makes it possible to complete the process of the engagement between the pinion 16 and the ring gear 22 during the forward rotation of the engine 20, thus effectively cranking the engine 20. This configuration also makes it possible to crank the engine 20 more immediately in comparison to the case of setting the rotation disable period.

The engine control system according to each of the first and second embodiments is configured to set the rotation disable period when the process of the engagement between the pinion 16 and the ring gear 22 is estimated to be completed during the reverse rotation of the engine 20 to thereby disable rotation of the pinion 16 within the rotation disable period, but the present invention is not limited to the structure.

Specifically, the engine control system according to a second modification of each of the first and second embodiments can be configured not to set the rotation disable period. This configuration makes it possible to rotate the pinion 16 by the motor 11 immediately after the completion of the engagement of the pinion 16 with the ring gear 22 independently of the rotational direction of the motor 20.

The engine control system according to each of the first and second embodiments is configured to set the rotation disable period after at least one of the engine restart conditions is met, but the present invention is not limited to the structure.

Specifically, the engine control system according to a third modification of each of the first and second embodiments can be configured to set the rotation disable period in step S205 before at least one of the engine restart conditions is met. For example, the engine control system according to the third modification can be configured to set the rotation disable period in step S205 before the operation in step S104 or after the operation in step S104 in FIG. 2.

The engine control system according to a fourth modification of each of the first and second embodiments can be configured to variably set the rotation disable period during the engine 20 coasting based on the engine-speed reduction rate ΔNE in step S205. For example, the engine control system according to the fourth modification can be configured to increase the rotation disable period with increase in the engine-speed reduction rate ΔNE.

The engine control system according to a fifth modification of each of the first and second embodiments can be configured to set the rotation disable period when the engine speed (ES in step S203 of FIG. 3) at the completion of the engagement of the pinion 16 with the ring gear 22, which is estimated based on, for example, the instantaneous rotational speed of the engine 20, is equal to or lower than a preset value (V1 in step S203); this preset value is set to be zero or a given negative value in step S203 (see t23 in FIG. 6B). That is, it is to be noted that, the greater the engine speed at the completion of the engagement of the pinion 16 with the ring gear 22 in the negative direction thereof, the greater turning force required to return the reverse rotation of the crankshaft 21 to the forward rotation thereof is. Thus, the configuration of the engine control system according to the fifth modification effectively disables drive of the motor 11 after the completion of the engagement of the pinion 16 with the ring gear 22.

Specifically, the engine control system according to the fifth modification estimates the engine speed at the completion of the engagement of the pinion 16 with the ring gear 22 based on, for example, the instantaneous rotational speed of the engine 20 in step S203. Then, the engine control system according to the fifth modification sets the rotation disable period when the estimated engine speed at the completion of the engagement of the pinion 16 with the ring gear 22 is equal to or less than the preset value set to be equal to or less than zero. Preferably, the engine control system according to the fifth modification sets the rotation disable period such that the rotation disable period is longer as the estimated engine speed is greater in the negative direction thereof.

The engine control system according to a sixth modification of each of the first and second embodiments can be configured to set the rotation disable period based on, in place of or in addition to the engine speed, at least one parameter associated with the engine speed in step S205. This is because the engine-speed reduction ratio ΔNE is changed depending on the operating conditions of the engine 20 and/or those of accessories 70 installed in the motor vehicle.

Specifically, as the at least one parameter, the position of the throttle valve as described above, and a parameter associated with the operating conditions of at least one of the accessories 70 can be used.

The engine control system according to each of the first and second embodiments is configured to carry out the determination of whether the engagement of the pinion 16 with the ring gear 22 is completed based on the engagement required time, or the determination of whether the pinion 16 is in abutment with the ring gear 22 based on the abutment required time, but the present invention is not limited thereto.

Specifically, the engine starting system according to a seventh modification of each of the first and second embodiments can be equipped with a sensor 71 illustrated by phantom lines in FIG. 1; this sensor 71 is electrically connected to the ECU 30 and arranged to detect that the engagement of the pinion 16 with the ring gear 22 is completed or the pinion 16 is in abutment with the ring gear 22. That is, the engine starting system according to the seventh modification can be configured to carry out the determination of whether the engagement of the pinion 16 with the ring gear 22 is completed or the determination of whether the pinion 16 is in abutment with the ring gear 22 based on a result of the detection by the sensor 71. The engine starting system according to the seventh modification can be configured to cause a current to flow through between the pinion 16 and the ring gear 22 when they are contacted or engaged with each other, and to carry out the determination of whether the engagement of the pinion 16 with the ring gear 22 is completed or the determination of whether the pinion 16 is in abutment with the ring gear 22 based on whether the current flows through between the pinion 16 and the ring gear 22.

The engine control system according to each of the first and second embodiments is configured to determine whether the engagement required time is equal to or less than the preset threshold value based on the temperature in the engine coolant in step S202, but the present invention is not limited thereto.

Figure 11:
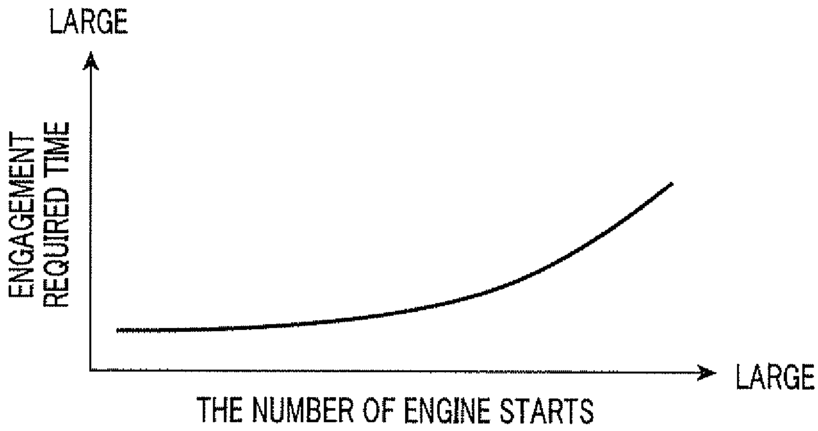
FIG. 11 is a graph schematically illustrating a relationship between a variable of the number of engine starts by a starter illustrated in FIG. 1 and that of the engagement required time according to an eighth modification of each of the first and second embodiments.

Specifically, the engine starting system according to an eighth modification of each of the first and second embodiments can be configured to determine whether the engagement required time is equal to or less than the preset threshold value based on the number of engine starts by the starter 10. That is, the greater the number of engine starts by the starter 10 is, the more the tooth section of the pinion 16 and that of the ring gear 22 wear out, resulting in that it may be difficult for the pinion 16 to be engaged with the ring gear 22. For this reason, as illustrated in, for example, FIG. 11, the greater the number of engine starts by the starter 10 is, the longer the engagement required time is.

In view of the circumstances, the engine starting system according to the eighth modification can be configured to determine whether the engagement required time is equal to or less than the preset threshold value based on the number of engine starts by the starter 10. The engine starting system according to the eighth modification can be configured to grasp the number of engine starts by the starter 10 based on the duration of use of the starter 10 from its initial state or the total mileage of the motor vehicle.

The engine control system according to each of the first and second embodiments is configured to rotate the pinion 16 without waiting for the completion of the engagement of the pinion 16 with the ring gear 22 when the engagement required time is equal to or less than the preset threshold value, but the present invention is not limited thereto.

Specifically, the engine starting system according to a ninth modification of each of the first and second embodiments can be configured to wait for the completion of the engagement of the pinion 16 with the ring gear 22 independently of whether the engagement required time is equal to or less than the preset threshold value, and thereafter, rotate the pinion 16 by the motor 11.

The engine starting system according to a tenth modification of the first embodiment can be configured to drive the motor 11 at the timing when the pinion 16 becomes in abutment with the ring gear 22 when it is determined that the engagement required time is equal to or less than the preset threshold value. This tenth modification reliably restarts the engine 20 as immediately as possible.

The engine starting system according to an eleventh modification of each of the first and second embodiments can be configured to rotate the pinion 16 without waiting for the completion of the engagement of the pinion 16 with the ring gear 22 when at least part of the process of the engagement between the pinion 16 and the ring gear 22 has been carried out and the engine 20 is estimated to be rotated in the forward direction. When at least part of the process of the engagement between the pinion 16 and the ring gear 22 has been carried out and the engine 20, the positional relationship between the pinion 16 and the ring gear 22 belongs to the first positional relationship therebetween.

Figure 4:
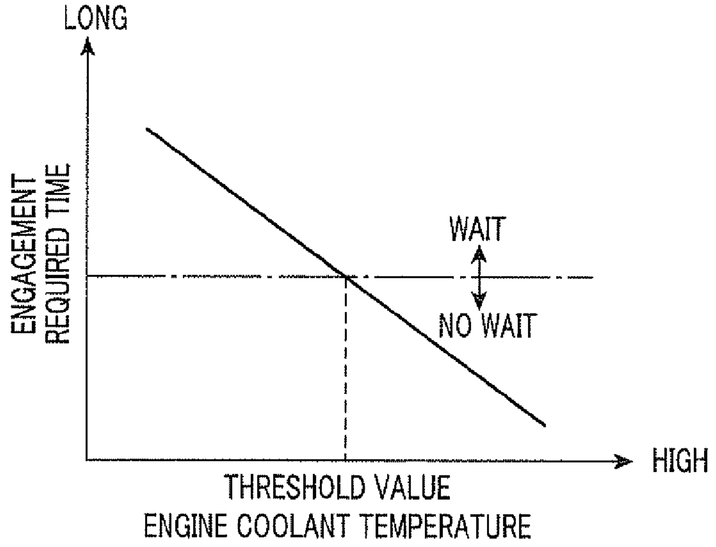
FIG. 4 is a graph schematically illustrating a relationship between a variable of the temperature in an engine coolant and that of an engagement required time according to the first embodiment.

Specifically, when an engine restart request occurs after a preset ratio of the engagement required time has elapsed since the start of the shift of the pinion 16 and the engine speed at the occurrence of the engine restart request is estimated to be a positive value, the engine starting system according to the eleventh modification can be configured to start rotation of the pinion 16 without waiting for the completion of the engagement process in step S204*a* and S207 in FIG. 4. In this eleventh modification, the engine speed at the occurrence of an engine restart request can be estimated based on the instantaneous rotational speed of the engine 20 measured by the crank angle sensor 23. When the remaining time until the completion of the engagement of the pinion 16 with the ring gear 22 at the occurrence of the engine restart request is short and engine 20 is rotated in the forward direction, it is possible to properly engage the pinion 16 with the ring gear 22 while restarting the engine 20 immediately in response to the engine restart request.

The engine control system according to each of the first and second embodiments and its modification is configured to, when the ignition key K inserted in the key cylinder is turned by the driver from the ignition-ON position 1G to the starter-ON position ST, the ignition switch 19 serving as a starter switch is turned on so that electric power of the battery 12 is supplied to the solenoid 18*a* and solenoid 13*a* so as to activate the starter 10, but the present invention is not limited to the structure.

Specifically, a driver-operable starter switch, such as a push-button switch, can be provided in the motor vehicle. In this modification, when the driver-operable starter switch is operated by the driver, electric power of the battery 12 is supplied to the solenoid 18*a* and solenoid 13*a* so as to activate the starter 10.

For example, in the first and second embodiments and their modifications set forth above, the starter 10, the first drive relay 18, and the operations in steps S101 to S104 correspond to a pinion shift unit, the operation in step S203 or S303 corresponds to an engagement determining unit, and the operations in steps S204, S206, and S207 or those in steps S303, S306, and S307 correspond to a rotation adjusting unit.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An engine stop and start control system having an automatic stop and start function of automatically stopping an engine when a preset automatic stop condition is met, and of performing cranking by a starter when a preset engine restart condition is met to restart the engine, the engine stop and start control system comprising:

an engagement control means that shifts a pinion of the starter to a ring gear coupled to an output shaft of the engine to perform engagement between the pinion and the ring gear during the engine coasting after the automatic stop of the engine;

a rotation control means that rotates the pinion using a rotational drive means when the engine restart condition is met;

an engagement determining means that determines whether the engagement by the engagement control means is completed or the pinion has been shifted to a contact position of the ring gear so that the pinion is in abutment with the ring gear; and a state determining means that determines, based on a speed of the engine or a parameter associated with the speed of the engine, whether the engagement is completed or the pinion is in abutment with the ring gear during reverse rotation of the output shaft of the engine, wherein:

when the engine restart condition is met after the engagement by the engagement control means is started and before it is determined that the engagement by the engagement control means is completed or the pinion is shifted to the contact position of the ring gear so that the pinion is in abutment with the ring gear, the rotation control means disables rotational drive of the pinion by the rotational drive means during a period until it is determined that the engagement by the engagement control means is completed or the pinion is shifted to the contact position of the ring gear so that the pinion is in abutment with the ring gear, the rotation control means determines the period when it is determined that the engagement is completed or the pinion is in abutment with the ring gear during reverse rotation of the output shaft of the engine, and the state determining means determines whether the engagement is completed or the pinion is in abutment with the ring gear during reverse rotation of the output shaft of the engine based on a reduction rate of the speed of the engine.

2. An engine stop and start control system having an automatic stop and start function of automatically stopping an engine when a preset automatic stop condition is met, and of performing cranking by a starter when a preset engine restart condition is met to restart the engine, the engine stop and start control system comprising:

an engagement control means that shifts a pinion of the starter to a ring gear coupled to an output shaft of the engine to perform engagement between the pinion and the ring gear during the engine coasting after the automatic stop of the engine;

a rotation control means that rotates the pinion using a rotational drive means when the engine restart condition is met;

an engagement determining means that determines whether the engagement by the engagement control means is completed or the pinion is shifted to a contact position of the ring gear so that the pinion is in abutment with the ring gear;

a period setting means that sets a rotation disable period when the engagement is completed or the pinion is in abutment with the ring gear during reverse rotation of the output shaft of the engine, rotation of the pinion by the rotational drive means being disabled during the rotation disable period; and a state determining means that determines, based on a speed of the engine or a parameter associated with the speed of the engine, whether the engagement is completed or the pinion is in abutment with the ring gear during reverse rotation of the output shaft of the engine, wherein:

when the engine restart condition is met after the engagement by the engagement control means is started and before it is determined that the engagement by the engagement control means is completed or the pinion is shifted to the contact position of the ring gear so that the pinion is in abutment with the ring gear, the rotation control means waits until it is determined that the engagement by the engagement control means is completed or the pinion is shifted to the contact position of the ring gear so that the pinion is in abutment with the ring gear, and thereafter starts rotational drive of the pinion by the rotational drive means, when the rotation disable period is set by the period setting means, the rotation control means waits for a lapse of the rotation disable period, and thereafter, starts rotation of the pinion by the rotational drive means, the state determining means determines whether the engagement is completed or the pinion is in abutment with the ring gear during reverse rotation of the output shaft of the engine based on a reduction rate of the speed of the engine, and the period setting means sets the rotation disable period when it is determined that the engagement is completed or the pinion is in abutment with the ring gear during reverse rotation of the output shaft of the engine.

3. An engine stop and start control system having an automatic stop and start function of automatically stopping an engine when a preset automatic stop condition is met, and of performing cranking by a starter when a preset engine restart condition is met to restart the engine, the engine stop and start control system comprising:

an engagement control means that shifts a pinion of the starter to a ring gear coupled to an output shaft of the engine to perform engagement between the pinion and the ring gear during the engine coasting after the automatic stop of the engine;

a rotation control means that rotates the pinion using a rotational drive means when the engine restart condition is met;

an engagement determining means that determines whether the engagement by the engagement control means is completed or the pinion is shifted to a contact position of the ring gear so that the pinion is in abutment with the ring gear; and a period setting means that sets a rotation disable period when the engagement is completed or the pinion is in abutment with the ring gear during reverse rotation of the output shaft of the engine, rotation of the pinion by the rotational drive means being disabled during the rotation disable period, wherein:

when the engine restart condition is met after the engagement by the engagement control means is started and before it is determined that the engagement by the engagement control means is completed or the pinion is shifted to the contact position of the ring gear so that the pinion is in abutment with the ring gear, the rotation control means waits until it is determined that the engagement by the engagement control means is completed or the pinion is shifted to the contact position of the ring gear so that the pinion is in abutment with the ring gear, and thereafter starts rotational drive of the pinion by the rotational drive means, when the rotation disable period is set by the period setting means, the rotation control means waits for a lapse of the rotation disable period, and thereafter, starts rotation of the pinion by the rotational drive means, and the engagement control means uses a first start time for the engagement when a reduction rate of a speed of the engine after the automatic stop of the engine is less than or equal to a preset threshold, and the engagement control means uses a second start time for the engagement when the reduction rate of the speed of the engine after the automatic stop of the engine is greater than the preset threshold, wherein the second start time is earlier than the first start time.

4. An engine stop and start control system having an automatic stop and start function of automatically stopping an engine when a preset automatic stop condition is met, and of performing cranking by a starter when a preset engine restart condition is met to restart the engine, the engine stop and start control system comprising:

an engagement control means that shifts a pinion of the starter to a ring gear coupled to an output shaft of the engine to perform engagement between the pinion and the ring gear during the engine coasting after the automatic stop of the engine;

a rotation control means that rotates the pinion using a rotational drive means when the engine restart condition is met;

an engagement determining means that determines whether the engagement by the engagement control means is completed or the pinion is shifted to a contact position of the ring gear so that the pinion is in abutment with the ring gear;

a period setting means that sets a rotation disable period when the engagement is completed or the pinion is in abutment with the ring gear during reverse rotation of the output shaft of the engine, rotation of the pinion by the rotational drive means being disabled during the rotation disable period; and a required-time determining means that determines whether an engagement required time is equal to or less than a preset threshold, the engagement required time being a time required from a start of the engagement, wherein:

when the engine restart condition is met after the engagement by the engagement control means is started and before it is determined that the engagement by the engagement control means is completed or the pinion is shifted to the contact position of the ring gear so that the pinion is in abutment with the ring gear, the rotation control means waits until it is determined that the engagement by the engagement control means is completed or the pinion is shifted to the contact position of the ring gear so that the pinion is in abutment with the ring gear, and thereafter starts rotational drive of the pinion by the rotational drive means, when the rotation disable period is set by the period setting means, the rotation control means waits for a lapse of the rotation disable period, and thereafter, starts rotation of the pinion by the rotational drive means, and when it is determined that the engagement required time is equal to or less than the preset threshold by the required-time determining means within a period after the engagement by the engagement control means is started and before it is determined that the engagement by the engagement control means is completed, the rotation control means starts the rotational drive of the pinion by the rotation drive means without waiting until it is determined that the engagement is completed by the engagement determining means.

5. The engine stop and start control system according to claim 4, wherein, when the engine restart condition is met before the pinion being in abutment with the ring gear, the rotation control means starts the rotational drive of the pinion by the rotational drive means at timing when the pinion is shifted to be in abutment with the ring gear.

6. The engine stop and start control system according to claim 4, wherein the required-time determining means determines whether the engagement required time is equal to or less than the preset threshold based on a temperature of the engine.

7. The engine stop and start control system according to claim 4, wherein the required-time determining means whether the engagement required time is equal to or less than the preset threshold based on a number of starts of the engine by the starter.

8. An engine stop and start control system having an automatic stop and start function of automatically stopping an engine when a preset automatic stop condition is met, and of performing cranking by a starter when a preset engine restart condition is met to restart the engine, the engine stop and start control system comprising:

an engagement control means that shifts a pinion of the starter to a ring gear coupled to an output shaft of the engine to perform engagement between the pinion and the ring gear during the engine coasting after the automatic stop of the engine;

a rotation control means that rotates the pinion using a rotational drive means when the engine restart condition is met;

an engagement determining means that determines whether the engagement by the engagement control means is completed or the pinion has been shifted to a contact position of the ring gear so that the pinion is in abutment with the ring gear; and a required-time determining means that determines whether an engagement required time is equal to or less than a preset threshold, the engagement required time being a time required from a start of the engagement to a completion of the engagement, wherein, when the engine restart condition is met after the engagement by the engagement control means is started and before it is determined that the engagement by the engagement control means is completed or the pinion is shifted to the contact position of the ring gear so that the pinion is in abutment with the ring gear, the rotation control means waits until it is determined that the engagement by the engagement control means is completed or the pinion is shifted to the contact position of the ring gear so that the pinion is in abutment with the ring gear, and thereafter starts rotational drive of the pinion by the rotational drive means, and when it is determined that the engagement required time is equal to or less than the preset threshold by the required-time determining means within a period after the engagement by the engagement control means is started and before it is determined that the engagement by the engagement control means is completed, the rotation control means starts rotational drive of the pinion by the rotation drive means without waiting until it is determined that the engagement is completed by the engagement determining means.

* * * * *